(12) United States Patent
Mahmood et al.

(10) Patent No.: US 12,432,662 B2
(45) Date of Patent: Sep. 30, 2025

(54) BEAMFORMING ESTIMATION

(71) Applicant: MAXLINEAR, INC., Carlsbad, CA (US)

(72) Inventors: Zohaib Mahmood, Westwood, MA (US); Hajir Roozbehani, Waltham, MA (US); Alexandre Megretski, Acton, MA (US); Yan Li, Lexington, MA (US)

(73) Assignee: MaxLinear, Inc., Carlsbad, CA (US)

( * ) Notice: Subject to any disclaimer, the term of this patent is extended or adjusted under 35 U.S.C. 154(b) by 403 days.

(21) Appl. No.: 18/175,524

(22) Filed: Feb. 27, 2023

(65) Prior Publication Data
US 2023/0276368 A1   Aug. 31, 2023

Related U.S. Application Data

(60) Provisional application No. 63/268,606, filed on Feb. 27, 2022.

(51) Int. Cl.
*H04B 7/185* (2006.01)
*H04L 5/00* (2006.01)
(Continued)

(52) U.S. Cl.
CPC ......... *H04W 52/143* (2013.01); *H04L 5/0051* (2013.01); *H04W 52/243* (2013.01); *H04W 52/367* (2013.01)

(58) Field of Classification Search
CPC ............. H04W 52/143; H04W 52/243; H04W 52/367; H04W 52/42; H04W 52/24; H04W 52/50; H04W 52/16; H04W 52/12; H04W 52/146; H04L 5/0051; H04L 5/001; H04L 5/0048; H04L 5/006; H04L 5/0023
See application file for complete search history.

(56) References Cited

U.S. PATENT DOCUMENTS

| | | | | |
|---|---|---|---|---|
| 2011/0059705 A1* | 3/2011 | Tajer | ................ | H04B 7/0626 455/114.3 |
| 2015/0098440 A1* | 4/2015 | Yang | ................ | H04L 5/0051 370/330 |

(Continued)

FOREIGN PATENT DOCUMENTS

WO   WO-2022078790 A2 *   4/2022   ........... H04L 5/0023

OTHER PUBLICATIONS

5G Americas White Paper: Advanced Antenna Systems for 5G—Aug. 2019.

(Continued)

*Primary Examiner* — Phuongchau Ba Nguyen
(74) *Attorney, Agent, or Firm* — Buchalter; Jason W. Croft

(57) ABSTRACT

According to an aspect of an embodiment, a base station configured for beamforming estimation in a massive multiple input multiple output (mMIMO) radio access network (RAN) (mMIMO-RAN) may comprise a processing device and a transceiver. The processing device may be configured to obtain a channel estimate for a user equipment (UE). The processing device may be configured to compute a first power level adjustment for a downlink (DL) signal and a second power level adjustment for the DL signal. The second power level adjustment may be based on a power constraint. The transceiver may be configured to transmit the DL signal to the UE.

20 Claims, 25 Drawing Sheets

(51) Int. Cl.
  *H04W 52/14*   (2009.01)
  *H04W 52/24*   (2009.01)
  *H04W 52/36*   (2009.01)

(56) References Cited

U.S. PATENT DOCUMENTS

| | | | |
|---|---|---|---|
| 2016/0043883 | A1 | 2/2016 | Zirwas |
| 2016/0301457 | A1 | 10/2016 | Liang |
| 2016/0373181 | A1 | 12/2016 | Black et al. |
| 2017/0324457 | A9* | 11/2017 | Frank .................. H04B 7/0619 |
| 2018/0019795 | A1* | 1/2018 | Zhang ................. H04B 7/0486 |
| 2018/0205421 | A1 | 7/2018 | Park et al. |
| 2020/0007207 | A1 | 1/2020 | Liang et al. |
| 2021/0119713 | A1 | 4/2021 | O'Shea et al. |
| 2021/0273707 | A1* | 9/2021 | Yoo ....................... H04L 1/0041 |
| 2022/0337278 | A1* | 10/2022 | Caporal Del Barrio ..................... H04W 36/0072 |
| 2023/0155864 | A1* | 5/2023 | Abdoli ................ H04L 25/0204 370/329 |
| 2024/0291526 | A1* | 8/2024 | Mahmood ............ H04B 7/0617 |
| 2024/0322868 | A1* | 9/2024 | Mahmood ............ H04B 7/0452 |
| 2024/0389100 | A1* | 11/2024 | Ibrahim ................ H04W 72/20 |

OTHER PUBLICATIONS

International Search Report and Written Opinion in PCT/US2023/063384 mailed Sep. 8, 2023.

\* cited by examiner

BEAMFORMING ESTIMATION

RELATED APPLICATION

This application claims the benefit of U.S. Provisional Application No. 63/268,606, filed Feb. 27, 2022, the disclosure of which is incorporated herein by reference in its entirety.

The embodiments discussed in the present disclosure are related to beamforming estimation.

BACKGROUND

Unless otherwise indicated herein, the materials described herein are not prior art to the claims in the present application and are not admitted to be prior art by inclusion in this section.

Beamforming is a signal processing technique used for directional signal transmission. There are different variants of beamforming including analog, digital, and hybrid beamforming, two-dimensional beamforming, three-dimensional beamforming (as used in multiple input multiple output (MIMO)), and the like. Beamforming may be used to achieve spatial selectivity in different wireless communication standards including 5G and IEEE 802.11ac.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

In some embodiments, a base station (BS) may be configured for beamforming estimation in a massive multiple input multiple output (mMIMO) radio access network (RAN) (mMIMO-RAN). The BS may comprise a processing device and a transceiver. The processing device may be configured to obtain, at the BS, a channel estimate for a user equipment (UE). The processing device may be configured to compute, at the BS, a first power level adjustment for a downlink (DL) signal for transmission to the UE, wherein the first power level adjustment is computed using the channel estimate for the UE, and compute, at the BS, a second power level adjustment for the DL signal for transmission to the UE, wherein the second power level adjustment is computed by adjusting the first power level adjustment based on an antenna power constraint. The processing device may be configured to precode, at the BS, using the second power level adjustment, the DL signal for transmission to the UE. The transceiver may be configured to transmit the DL signal to the UE.

In some embodiments, a user equipment (UE) may be configured for beamforming estimation in a mMIMO RAN. The UE may comprise a transceiver configured to receive a DL signal having a precoded message from a BS and a processing device. The processing device may be configured to: send, at the UE, a channel estimate for the UE. The processing device may be configured to generate, at the UE, a decoder by: initializing the decoder using the channel estimate, and adjusting the decoder to decode the precoded message, wherein the precoded message was precoded based on an antenna power constraint. The processing device may be configured to decode, at the UE, the precoded message using the decoder.

In some embodiments, a computer-readable storage medium may include computer executable instructions. The computer readable instructions, when executed by one or more processors, may cause a BS in an mMIMO-RAN to: initialize a precoder using zero-forcing based on a channel estimate; adjust the precoder based on jointly maximizing the signal with respect to the noise and minimizing the interference with respect to the noise; adjust the precoder based on a power constraint using minimum mean square error (MMSE); and generate the precoder for precoding a downlink signal for transmission from the BS to a user equipment (UE).

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
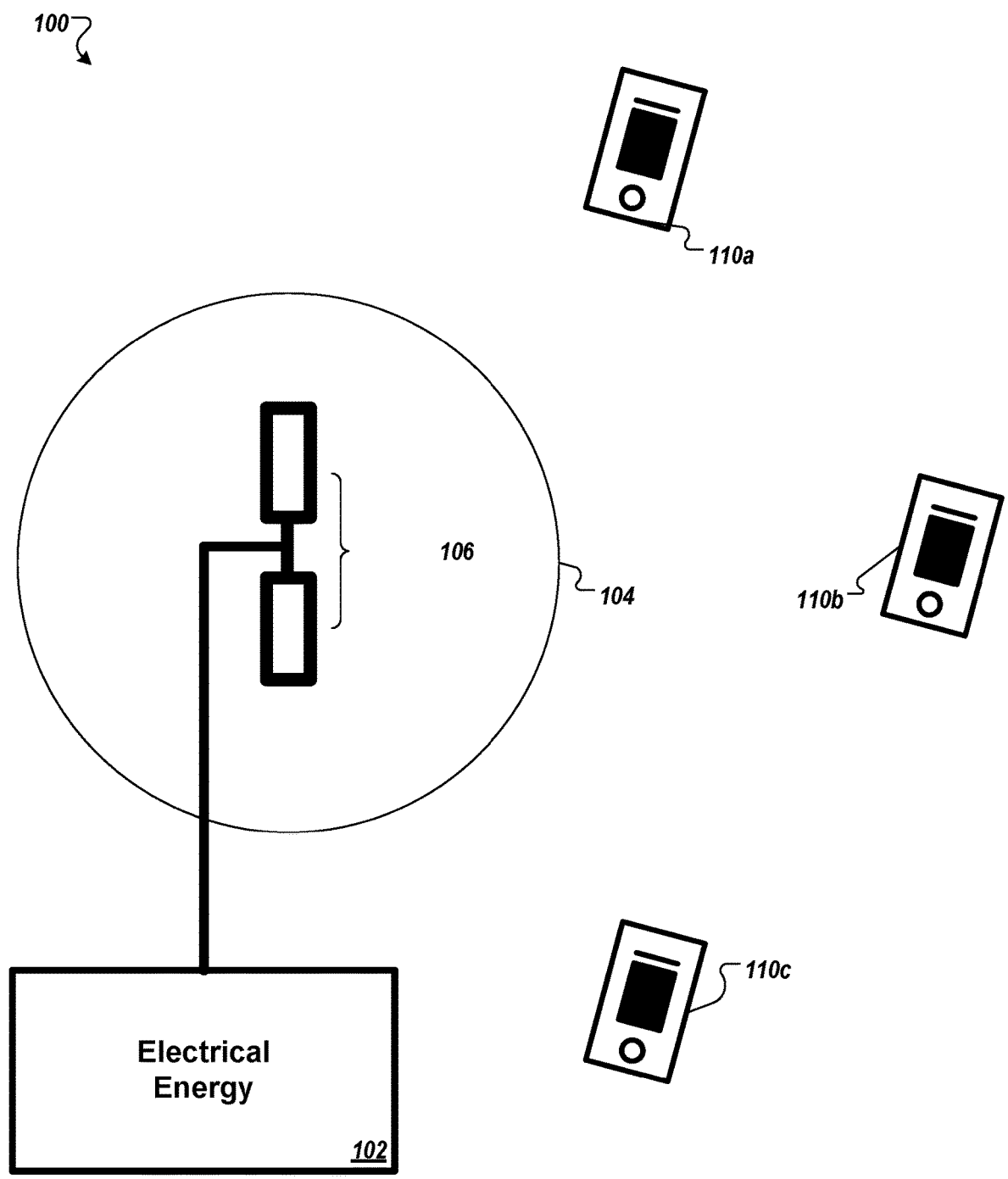
FIG. 1 illustrates an example antenna radiation pattern associated with a beamforming estimation.

Beamforming is a signal processing technique used for directional signal transmission. Directional signal transmission may be used to direct patterns of constructive and destructive interference so that user equipment (UE) may receive enhancements in received signals because of the increase in spatial diversity.

In multi-user multiple-input multiple-output (MU-MIMO) networks (e.g., mMIMO, downlink (DL) and uplink (UL) beamforming and beamforming weight estimation may be used with a zero-forcing algorithm. Zero Forcing (ZF) refers to a class of methods that attempt to "zero out" the inter-user interference in MU-MIMO situations. Zero Forcing may be used to provide the solution to the following optimization:

$$\|W\|_F^2 \to \min \text{ s.t } HW = I$$

in which W may be the precoder matrix, H may be the channel matrix, and I is the identity matrix. Several variants of ZF may be used based on the definition of the channel matrix, H.

Another variant of ZF is Regularized ZF (RZF) which may be used to provide the solution to the following optimization:

$$\|HW - I\|_F^2 + r\|W\|_F^2 \to \min$$

in which r is a regularization parameter that may be selected based on various parameters such as the signal to noise ratio (SNR), the number of user equipment (UE), the number of antennas (transmit antennas and/or receiving antennas), and the like.

RZF and ZF have similar complexity because both may be solved using analytical expressions that reduce to solving a linear system of equations, although RZF may perform better than ZF provided based on the selection of r. The dependence of r on the complexity may not be trivial and may include factors such as number of users and the SNR. Additionally, RZF may not account for power constraints which may not provide power distributions across different PA that are balanced. Power distribution may depend on the choice of the parameter r and the distribution of users. Typically as r increases in value and the number of groups increase in value (i.e., smaller number of layers), the power distribution may be more balanced across different power amplifiers (as measured by variance, or the like) but increasing r and increasing the number of groups may negatively affect the throughput.

It may be desirable to have an approach that has a comparable complexity to ZF/RZF but may maximize the power transmitted through the antennas without sacrificing spatial diversity. One way to attempt to achieve this is to set up optimization that is similar to ZF/RZF with the constraint:

$$\sum_i |W(:,i)|^2 \le 1/N$$

where N is the number of power amplifiers. However, this typically does not give much performance improvement because the additional power is not properly directed to the UEs. For instance, a scheme known as maximum ratio transmission (MRT) may provide an increased uniformity of power distribution but with a throughput that may be about 25% lower. In addition the closed form of ZF/RZF is lost when MRT is used.

Disclosed herein are systems, devices, and methods for using power constraints in beamforming estimation without a significant increase in complexity. The disclosure herein differs from ZF (which attempts to "zero-out" interference, e.g., maximizing the SINR without considering the SNR which may degrade the signal) while the present disclosure reduces interference to a desired level while considering other factors that affect the performance of the system. These factors may include: (i) balancing the SNR and signal to interference plus noise ratio (SINR), (ii) basing power constraints on the power amplifiers because each power amplifier may have a distinct maximum power, (iii) reducing interference for weak UEs, and (iv) adapting to small changes in channel conditions by using iteration.

Embodiments of the present disclosure will be explained with reference to the accompanying drawings.

Figure 2:
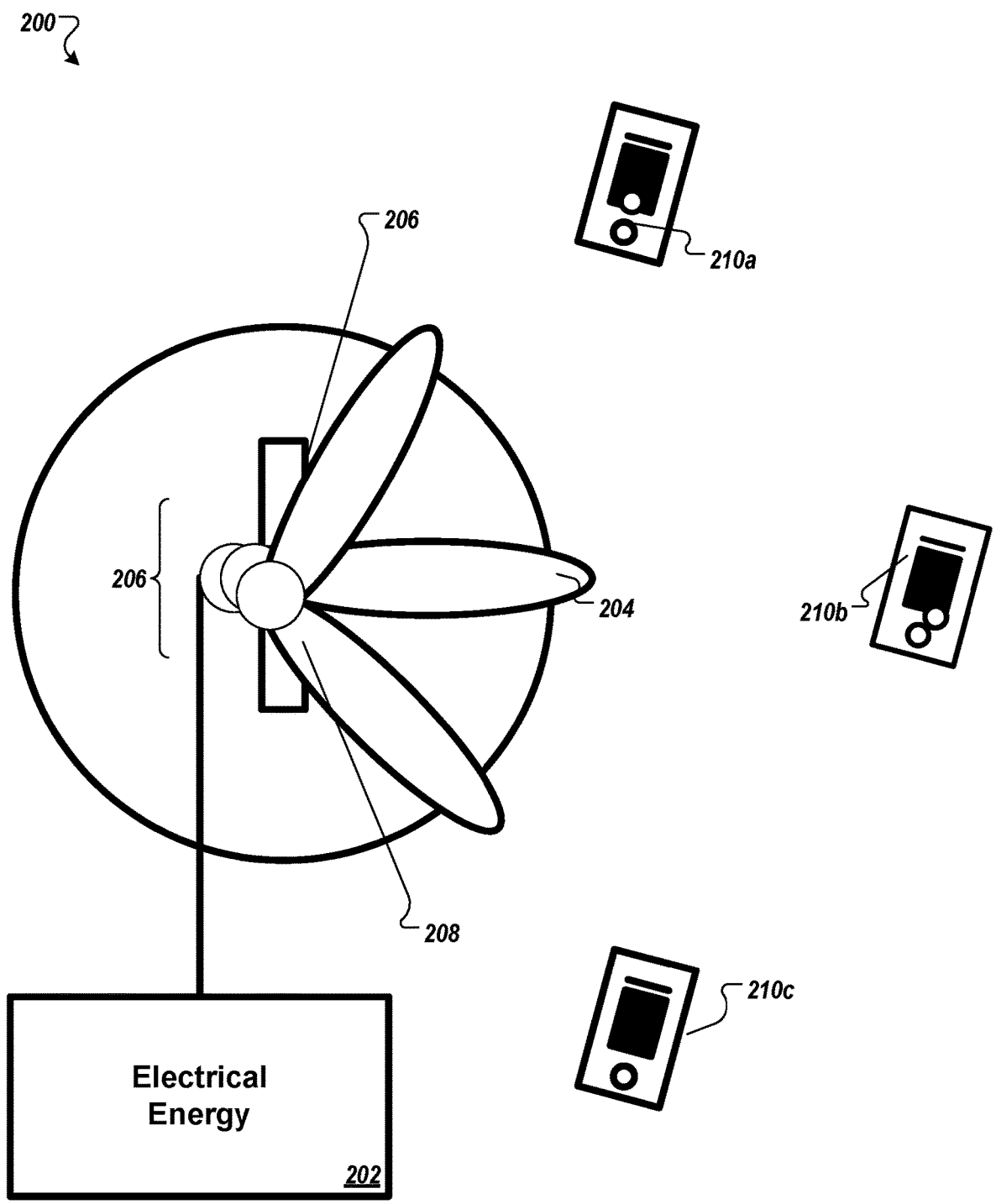
FIG. 2 illustrates an example antenna radiation pattern associated with a beamforming estimation.

As illustrated in FIGS. 1 and 2, beamforming may be used to add an additional dimension to the channel that depends on the spatial location of the UEs. In some embodiments, it is desirable to cancel or reduce interference between UEs by diagonalizing the channel so that the channel is diagonal post-decoding at the UE. For a matrix product of the channel, H, and the precoder, W, that does not have off-diagonal entries, each message, xi, may be recovered at its intended UE after equalization.

In an example, for a line of sight situation, FIG. 1 illustrates an antenna radiation pattern 104 radiating from an antenna 106 coupled to an energy source 102 in the communication system 1100 that has not been precoded. Because precoding has not been used, the antenna radiation pattern 104 is a spherical radiation pattern that does not radiate towards a specific UE (110a, 110b, 110c).

In contrast, in another line of sight situation, FIG. 2 illustrates an antenna radiation pattern 204 in the communication system 200 that has been precoded. The antenna radiation pattern 204 from the antenna 206 that is connected to a power source 202 may include a first lobe 204 directed to a UE 210b, a second lobe 206 directed to a UE 210a, and a third lobe directed to a UE 201c. The radiation pattern in FIG. 2 provides an example of beamforming. That is, the channel associated with each UE 210a, 210b, 210c has been diagonalized to cancel interference between UEs In some embodiments, wireless standards may have a specific granularity of W. This may be due to: (i) the channel, H, is frequency selective, or (ii) the channel, H, may be estimated at specific frequencies. A channel, H, may be frequency selective based on the stochastic and multipath characteristics of the channel. That is, when a signal arrives at the UE along different paths (i.e., multipath), even under a purely geometric model $y = s(t-t_1) \, s(t-t_2)$, the gain is frequency sensitive. Synchronization may not reverse the frequency sensitive characteristics of the channel.

In some embodiments, a channel, H, may be frequency insensitive when H is available on a coarse scale. The minimum granularity, in some wireless standards, is 2 resource blocks (RBs), which is comprised of 12 subcarriers and 14 orthogonal frequency division multiplexing (OFDM) symbols. Consequently, the matrix W is shared by at least 168 different channels (i.e., 12×14=168 channels).

Figure 3:
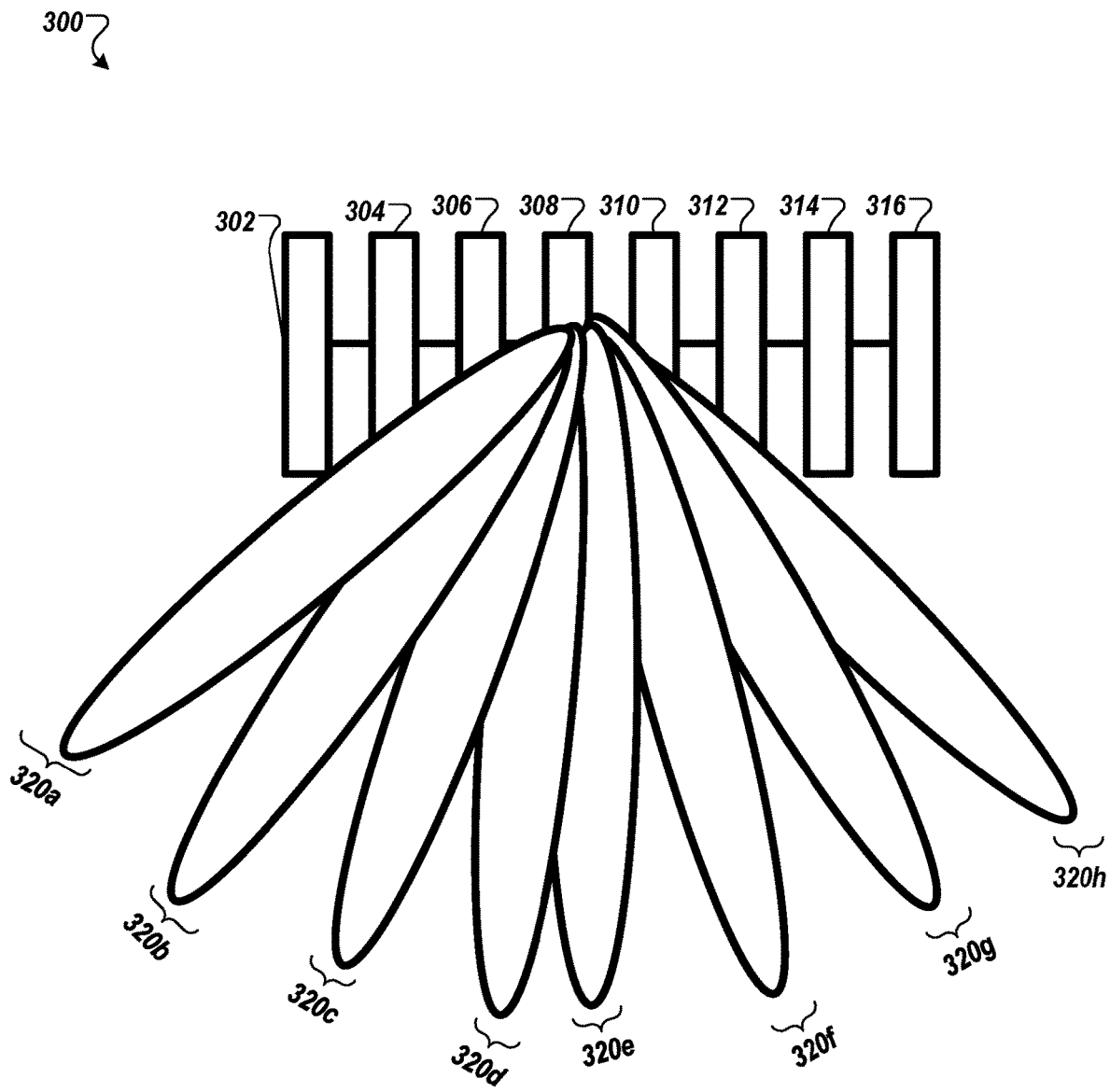
FIG. 3 illustrates an example antenna radiation pattern associated with a beamforming estimation.
Figure 4:
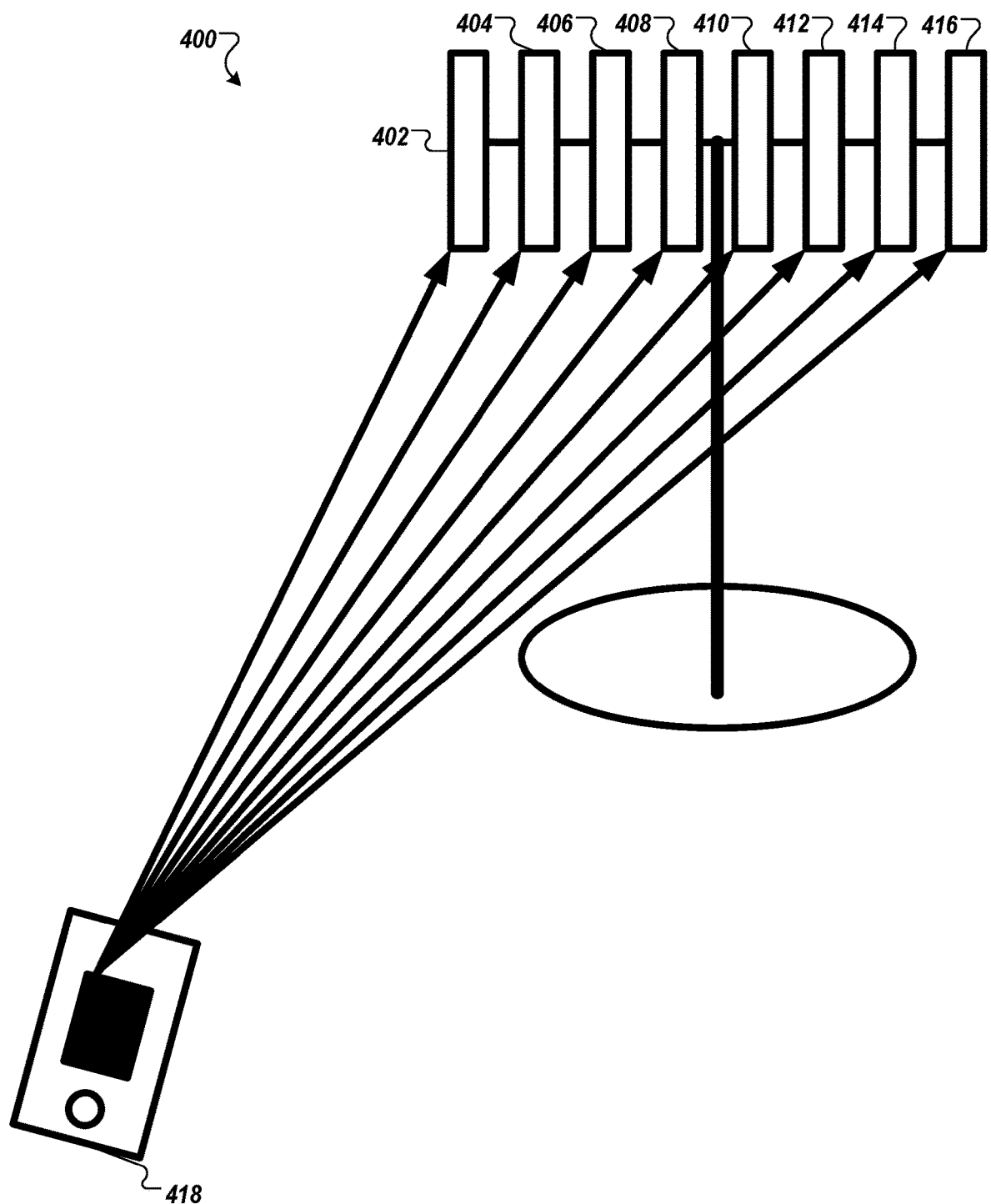
FIG. 4 illustrates an example of reference signal transmission associated with a beamforming estimation.

In some embodiments, as illustrated in FIGS. 3 and 4, a communication system 300, 400 may comprise antenna elements (e.g., 302, 304, 306, 308, 310, 312, 314, 316 in communication system 300 and 402, 404, 406, 408, 410, 412, 414, and 416 for communication system 400). As illustrated in FIG. 3, a grid of beams 320a, 320b, 320c, 320d, 320e, 320f, 320g, and 320h may be transmitted as separate data streams. As illustrated in FIG. 4, pilot signals may be transmitted from a UE 418 to antenna elements 402, 404, 406, 408, 410, 412, 414, and 416.

In some embodiments, the communication system 300, 400 may be designed to (i) be robust against estimation errors, and (ii) design the precoding matrix within a selected period of time (e.g., one slot). The precoder is designed to be robust against estimation errors because the channel, H, may be estimated at both the UE (e.g., 418) and the BS but may not be measured exactly. The precoder, when designed within one slot, may result in 550 precoders within 500 μs for a worst case scenario.

Channel diagonalization may be accomplished through two different techniques: (a) open loop, and (b) closed loop. For open loop channel diagonalization, the precoder, W, may be designed at the UE. In this technique, the BS sends refined pilot signals (e.g., channel state information (CSI) reference signal (RS) (CSI-RS) based on synchronization signal block (SSB)) and the UE computes the precoder based on its channel estimate. The UE obtains the channel estimate using type 1 feedback in single user mode or type 2 feedback in multi-user mode. This open loop approach creates nulls (i.e., narrow beams) during transmission to separate data streams (e.g., transmitted using beams 320a, 320b, 320c, 320d, 320e, 320f, 320g, and 320h). One example of this openloop approach is in a dual-polarized 64 transmit antenna (64T) system with 4 UEs and 8 layers. The center antennas consume more power compared to the other antennas in this open loop approach.

In some embodiments, for closed loop diagonalization, the precoder, W, may be designed based on channel estimates available at the BS and specific constraints. In the closed loop approach, the superposition of the transmit (TX) and receive (RX) beams may be narrow. One example of the closed loop approach uses the Zero-Forcing (ZF) algorithm.

Figure 5:
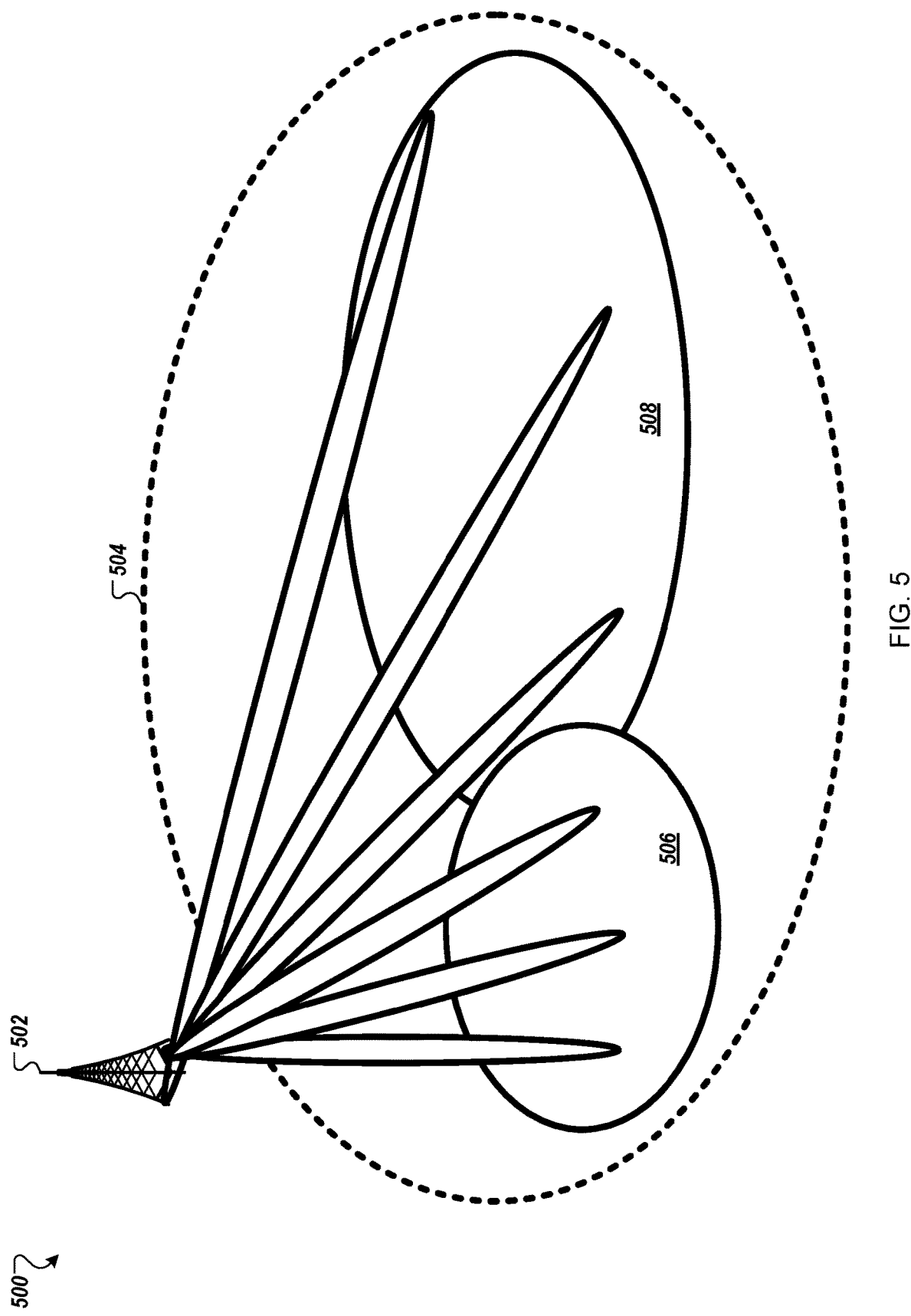
FIG. 5 illustrates an example communication system configured to perform beamforming estimation.

FIG. 5 illustrates an embodiment of a communication system 500 that may be configured for beamforming estimation and actuation. A base station (BS) 502 may be operable in a mMIMO RAN. In one example, the BS 502 may be operable using a low-level split (i.e., functional split options 6, 7, or 8) in which: (i) functional split option 6 splits the baseband functionality at the boundary of the MAC and PHY layers, (ii) functional split option 7 splits the physical layer, and (iii) functional split option 8 splits the physical layer and the radio frequency functions. In one example, a functional split option 7 may be: (a) a functional split option 7.1 (a functional split between the inverse fast Fourier transform (iFFT) functionality in the radio unit (RU) and beamforming functionality in the distributed unit (DU), (b) a functional split option 7.2 (a functional split between beamforming and resource element mapping in the RU and precoding in the DU), and (c) functional split option 7.3 (a downlink-only functional split between modulation and scrambling). In one example, functional split option 7.2 may be an open RAN (O-RAN) radio unit (RU) (O-RAN) split 7.2. Alternatively, or additionally, the BS 502 may be operable in a Third Generation Partnership Project (3GPP) network.

In some embodiments, the communication system 500 may have a cell coverage 504 that may include a near coverage area 506 and an edge coverage area 508. The near coverage area 506 may be closer in proximity to the BS 502 as compared to the edge coverage area 508. The BS 502, when configured for beamforming estimation and actuation as disclosed herein, may enhance network capacity for UEs in the near coverage area 506 relative to the network capacity for the near coverage area 506 when the BS 502 is not configured for beamforming estimation and actuation as disclosed herein.

Alternatively, or additionally, the BS 502, when configured for beamforming estimation and actuation as disclosed herein, may enhance network coverage for UEs in the edge coverage area 508 relative to the network coverage for the edge coverage area 508 when the BS 502 is not configured for beamforming estimation and actuation as disclosed herein. Alternatively, or additionally, the BS 502 may be configured to reduce a radio power dissipation amount when configured for beamforming estimation and actuation as compared to the power dissipation amount when not configured for beamforming estimation and actuation as disclosed herein.

Figure 6:
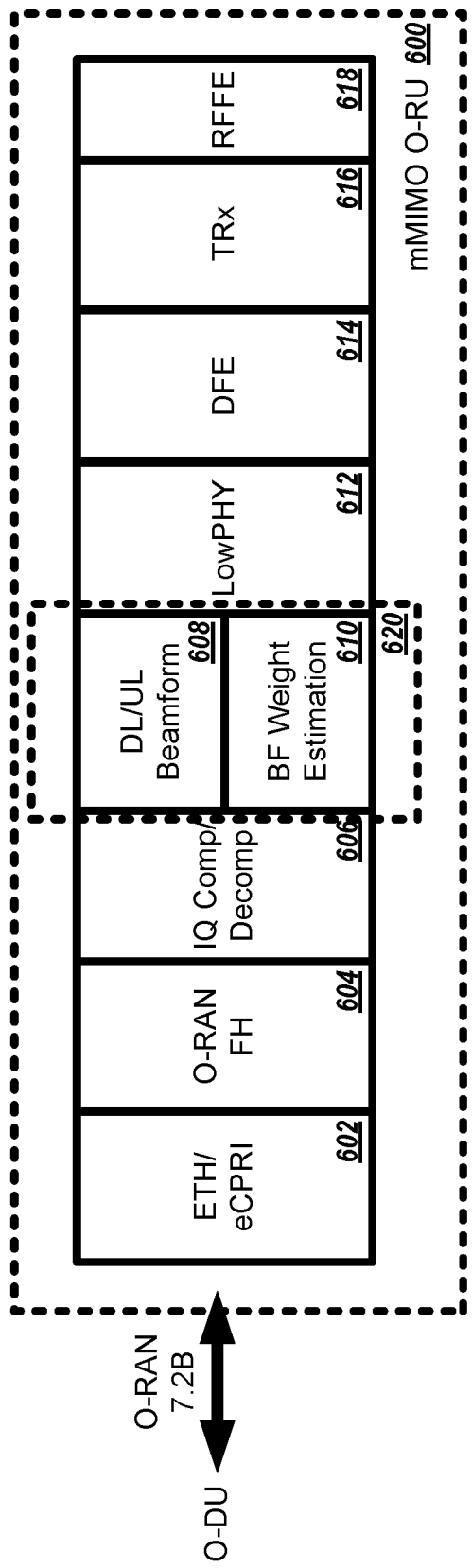
FIG. 6 illustrates a block diagram of another example communication system configured to perform beamforming estimation.

In some embodiments, as illustrated in FIG. 6, a BS (e.g., 502) may be operable in a mMIMO RAN. The BS may comprise a mMIMO O-RU 600 and an O-RAN distributed unit (O-DU). For an O-RAN 7.2B split, precoding and beamforming may occur in the mMIMO O-RU 600. The mMIMO O-RU may include one or more modules including: Ethernet (ETH)/Enhanced Common Public Radio Interface (eCPRI) 602, O-RAN fronthaul (FH) 604, IQ Compression/Decompression 606, downlink (DL)/uplink (UL) beamforming 608, beamforming weight estimation 610, lowPHY 612, digital front end (DFE) 614, transmission/receiving (TRx) 616, radio frequency front end (RFFE) 618, or the like.

Figure 7:
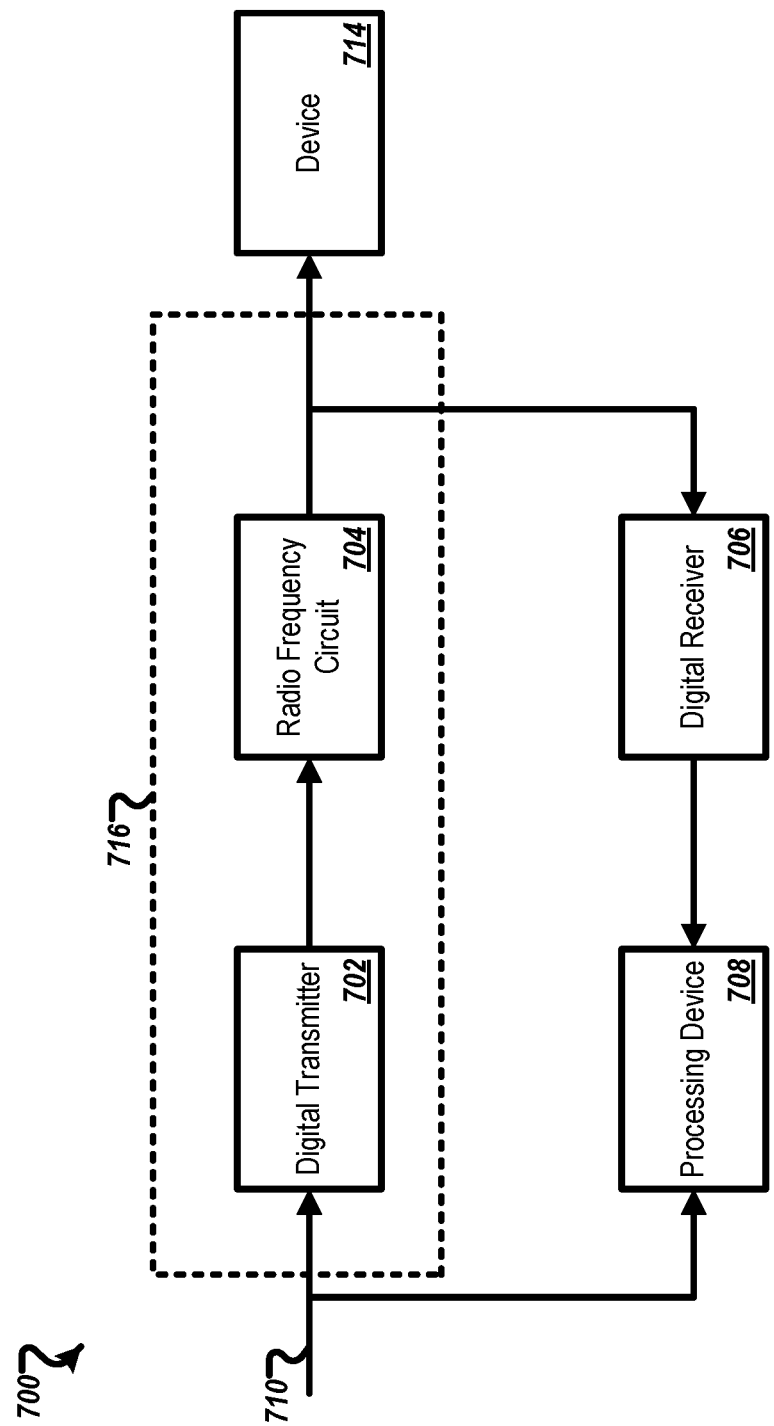
FIG. 7 illustrates a block diagram of an example system configured to perform beamforming estimation.

FIG. 7 illustrates a block diagram of an example communication system 700 configured for beamforming estimation and actuation, in accordance with at least one embodiment described in the present disclosure. The communication system 700 may include a digital transmitter 702, a radio frequency circuit 704, a device 714, a digital receiver 706, and a processing device 708. The digital transmitter 706 and the processing device may be configured to receive a baseband signal via connection 710. A transceiver 716 may comprise the digital transmitter 702 and the radio frequency circuit 704.

In some embodiments, the communication system 700 may include a system of devices that may be configured to communicate with one another via a wired or wireline connection. For example, a wired connection in the communication system 700 may include one or more Ethernet cables, one or more fiber-optic cables, and/or other similar wired communication mediums. Alternatively, or additionally, the communication system 700 may include a system of devices that may be configured to communicate via one or more wireless connections. For example, the communication system 700 may include one or more devices configured to transmit and/or receive radio waves, microwaves, ultrasonic waves, optical waves, electromagnetic induction, and/ or similar wireless communications. Alternatively, or additionally, the communication system 700 may include combinations of wireless and/or wired connections. In these and other embodiments, the communication system 700 may include one or more devices that may be configured to obtain a baseband signal, perform one or more operations to the baseband signal to generate a modified baseband signal, and transmit the modified baseband signal, such as to one or more loads.

In some embodiments, the communication system 700 may include one or more communication channels that may communicatively couple systems and/or devices included in the communication system 700. For example, the transceiver 716 may be communicatively coupled to the device 714.

In some embodiments, the transceiver 716 may be configured to obtain a baseband signal. For example, as described herein, the transceiver 716 may be configured to generate a baseband signal and/or receive a baseband signal from another device. In some embodiments, the transceiver 716 may be configured to transmit the baseband signal. For example, upon obtaining the baseband signal, the transceiver 716 may be configured to transmit the baseband signal to a separate device, such as the device 714. Alternatively, or additionally, the transceiver 716 may be configured to modify, condition, and/or transform the baseband signal in advance of transmitting the baseband signal. For example, the transceiver 716 may include a quadrature up-converter and/or a digital to analog converter (DAC) that may be configured to modify the baseband signal. Alternatively, or additionally, the transceiver 716 may include a direct radio frequency (RF) sampling converter that may be configured to modify the baseband signal.

In some embodiments, the digital transmitter 702 may be configured to obtain a baseband signal via connection 710. In some embodiments, the digital transmitter 702 may be configured to up-convert the baseband signal. For example, the digital transmitter 702 may include a quadrature up-converter to apply to the baseband signal. In some embodiments, the digital transmitter 702 may include an integrated digital to analog converter (DAC). The DAC may convert the baseband signal to an analog signal, or a continuous time signal. In some embodiments, the DAC architecture may include a direct RF sampling DAC. In some embodiments, the DAC may be a separate element from the digital transmitter 702.

In some embodiments, the transceiver 716 may include one or more subcomponents that may be used in preparing the baseband signal and/or transmitting the baseband signal. For example, the transceiver 716 may include an RF front end (e.g., in a wireless environment) which may include a power amplifier (PA), a digital transmitter (e.g., 702), a digital front end, an Institute of Electrical and Electronics Engineers (IEEE) 1588v2 device, a Long-Term Evolution (LTE) physical layer (L-PHY), an (S-plane) device, a management plane (M-plane) device, an Ethernet media access control (MAC)/personal communications service (PCS), a resource controller/scheduler, and the like. In some embodiments, a radio (e.g., a radio frequency circuit 704) of the transceiver 716 may be synchronized with the resource controller via the S-plane device, which may contribute to high-accuracy timing with respect to a reference clock.

In some embodiments, the transceiver 716 may be configured to obtain the baseband signal for transmission. For example, the transceiver 716 may receive the baseband signal from a separate device, such as a signal generator. For example, the baseband signal may come from a transducer configured to convert a variable into an electrical signal, such as an audio signal output of a microphone picking up a speaker's voice. Alternatively, or additionally, the transceiver 716 may be configured to generate a baseband signal for transmission. In these and other embodiments, the transceiver 716 may be configured to transmit the baseband signal to another device, such as the device 714.

In some embodiments, the device 716 may be configured to receive a transmission from the transceiver 716. For example, the transceiver 716 may be configured to transmit a baseband signal to the device 714.

In some embodiments, the radio frequency circuit 704 may be configured to transmit the digital signal received from the digital transmitter 702. In some embodiments, the radio frequency circuit 704 may be configured to transmit the digital signal to the device 714 and/or the digital receiver 706. In some embodiments, the digital receiver 718 may be configured to receive a digital signal from the RF circuit and/or send a digital signal to the processing device 708.

In some embodiments, the processing device 708 may be a standalone device or system, as illustrated. Alternatively, or additionally, the processing device 708 may be a component of another device and/or system. For example, in some embodiments, the processing device 708 may be included in the transceiver 716. In instances in which the processing device 708 is a standalone device or system, the processing device 708 may be configured to communicate with additional devices and/or systems remote from the processing device 708, such as the transceiver 716 and/or the device 714. For example, the processing device 708 may be configured to send and/or receive transmissions from the transceiver 716 and/or the device 714. In some embodiments, the processing device 708 may be combined with other elements of the communication system 700.

In some embodiments, the processing device 708 (e.g., at a base station) may be configured to obtain a channel estimate for a wireless device, such as a UE. The channel estimate may be obtained using any suitable reference signal that provides a suitable channel estimate, such as a sounding reference signal (SRS) that may be transmitted from a wireless device, such as a UE. When time division duplexing (TDD) is used, an SRS may be adequate to provide a BS with a channel estimate because channel reciprocity may be established between the BS and the UE in the TDD case.

In some embodiments, the processing device 708 may be configured to compute (e.g., at a base station) a first power level adjustment for a downlink signal for transmission to a wireless device such as a UE. The first power level adjustment may be computed using the channel estimate obtained from the wireless device such as the UE (e.g., as obtained using the SRS).

In some embodiments, the first power level adjustment for the downlink signal may be computed using a precoding matrix, W, that may be used for beamforming. The precoding matrix, W, may correspond to a decoding matrix D at the receiving wireless device (e.g., a UE) that may be used in decoding messages received at the wireless device that have been precoded using the matrix, W.

In some embodiments, the DL signal may be generated based on a number of inputs including one or more of: (i) a number of downlink layers (e.g., for a component carrier), (ii) a number of transmit antenna elements, (iii) a number of receive antenna elements, (iv) a polarization, (v) a number of antenna ports, or the like. In one example, the number of downlink layers may be any suitable value greater than or equal to 1 and less than or equal to 64. In one example, the number of downlink layers may be at least 8. In one example, the number of transmit antenna elements may be any suitable number greater than or equal to 2 and less than or equal to 128. In one example, the number of transmit antenna elements may be at least 32. In one example, the number of receive antenna elements may be any suitable number greater than or equal to 2 and less than or equal to 16. In one example, the number of receive antenna elements may be at least 32. In one example, the number of antenna ports may be any suitable number greater than or equal to 2 and less than or equal to 64. In other examples, the number of downlink layers, transmit antenna elements, receive antenna elements, and antenna ports may be any suitable number that may be supported in the network (e.g., a massive MIMO network).

In some embodiments, the precoding matrix, W, may be jointly optimized with D. To jointly optimize over W and D, a measure of signal-to-noise ratio may be used, including one or more of: a signal to interference plus noise ratio (SINR), an interference plus noise to signal (INSR) ratio, a signal to noise ratio (SNR), the like, or a combination thereof. In another example, a measure of power distribution across antennas may be used to jointly optimize over W and D.

In some embodiments, the precoding matrix, W, and the decoding matrix, D, may be jointly computed using the objective function:

$$\text{minimize}_{D,W} \|DHW - I\|_F^2 + \lambda_0 \|D\|_F^2 + \lambda_1 \Sigma_i \|D_i H_i W_i - I\|_F^2,$$

where: (i) H is a matrix for the channel with each row of the matrix H corresponding to a user i and each column of row i of the matrix H corresponding to the $j^{th}$ layer of the user i, (ii) I is the identity matrix, (iii) $\lambda_0$ and $\lambda_1$ are regularization parameters, and (iv) D=blkdiag($D_i$) has a block diagonal structure, subject to the constraint that $$\sum_i \|e_k' W_{ij}\|^2 \le \frac{1}{N}$$

where k=1, ..., N and $e_k'$ is the transpose of a unit row basis vector.

In some embodiments, when a power constraint is not used for jointly optimizing the precoding matrix, W, and the decoding matrix, $\underline{D}$, the Lagrangian may be computed as:

$$L(W,D) = Tr(W'H'D'DHW) - 2Tr(DHW) + \lambda_0 Tr(D'D) + \lambda_1 \Sigma_i (Wi'Hi'Di'D_i H_i W_i - 2D_i H_i W_i) + \text{const.}$$

In some embodiments, the gradients may be computed as:

$$\nabla_W L = 2H'D'DHW - 2H'D' + 2\lambda_1 [H_i'D_i'D_i H_i W_i - H_i'D_i']_i,$$

where $[v]_i$ indicates concatenation in row vector form, and $$\nabla_D' L = 2DHWW'H' - 2W'H' + 2\lambda_0 D + 2\lambda_1 \text{blk diag}[D_i H_i W_i W_i' H_i' - W_i' H_i']$$

In some embodiments, the (partial) Hessians may be computed as:

$$H_{WW} = DHH'D' + \lambda_1 [D_i' H_i' H_i D_i]_i, \text{ and}$$

$$H_{DD} = W'HH'W + \lambda_0 I + \lambda_1 \text{blk diag}[W_i' H_i' H_i W_i]$$

In some embodiments, iterations of Newton's method with projection may be computed as shown below:

```
1:  inputs : l(# of layers), H_{m×n}, r (per antenna power constraint)
2:  output : precoder matrix W_{n×l}
3:  W^0 ← W_{ZF} (initialize with ZF solution)
4:  D^0 ← (HW^0)†
5:  for itr=1 to numItr do
6:    ∇_W L^t = H'D^{t'}D^t HW^t − H'D^{t'} + λ_1[H_i'D_i^{t'}D_i^t H_i W_i^t − H_i'D_i^{t'}]_i
7:    ∇_D L^t = D^t HW^t W^{t'} H' − W^{t'}H' + λ_0 D^t + λ_1 blkdiag[D_i^t H_i W_i^t W_i^{t'} H_i' − W_i^{t'} H_i']
8:    H_{WW} = D^t HH'D^{t'} + λ_1 [D_i^{t'} H_i' H_i D_i^t]_i
9:    H_{DD} = W^{t'}HH'W^t + λ_0 I + λ_1 blkdiag[W_i^{t'} H_i' H_i W_i^t]
10:   W^{t+1} = W^t − η (∇_W L^t) H_{WW}†
11:   D^{t+1} = D^t − η H_{DD}† (∇_D L^t)
12:   W^{t+1} = PW^{t+1} (project W into the set of power constrained precoders)
13:   D^{t+1} = PD^{t+1} (project D into the set of feasible decoders)
14: end for
15: return W
```

In this algorithm: (i) the number of layers, $\ell$, may be defined for each UE, (ii) $H_{m \times n}$ may be the channel matrix for m transmit antennas and n UEs, (iii) r may be the power constraint for each of the m antennas, (iv) $W_{n \times \ell}$ may be the precoder matrix for n UEs with each UE having $\ell$ layers, (v) t is an iteration counter, (vi) " ' " is the partial derivative with respect to the particular matrix (e.g., H' is the partial derivative of the Lagrangian function with respect to W (for $\nabla_W L$) or the partial derivative of the Lagrangian function with respect to D (for $\nabla_D L$), (vii) $[v]_i$ indicates concatenation in row vector form, (viii) $H_{WW}^\dagger$ is the transposed partial Hessian and $H_{DD}^\dagger$ is the transposed partial Hessian, and (ix) η is the step size.

In some embodiments, one may also consider the following variation of the objective function:

$$\text{minimize}_{D,W} \|DHW - I\|_F^2 + \lambda_0 \|D\|_F^2 + \lambda_1 \sum_i \|D_i H_i W_i - I\|_F^2,$$

subject to the constraint $\sum_i \|e_k' W_{ij}\|^2 \le \frac{1}{N}$ where $k = 1, \ldots, N$, and $D_i H_i W_i = I,$ where projection is used to subject the objective function to the equality constraints.

In some embodiments, Zero Forcing (ZF) may be a class of algorithms that do not adjust for noise or decoding procedure at the UE. In one embodiment, a ZF algorithm may be computed using the objective function:

$$\|HW - I\|_F \to \min$$

For a matrix having dimensions of m×n (with m>n), ZF may be computed with a computational complexity of 2m^3 operations. This computation may not be a minimum energy solution because the computation may not be constrained by power. That is, the computation may not use all of the power amplifiers (i.e., there may not be a unique solution when H is a fat matrix, or H has fewer rows than columns). When HH' is invertible, a particular minima may be the right inverse of H: W=H'(HH')^{-1}. The right inverse may also be viewed as the solution to the following constrained minimum energy problem:

$$\|W\|_F^2 \to \min \text{ s.t } HW = I$$

which provides an objective function that adjusts for the total energy consumed by the power amplifiers and provides a unique solution.

In some embodiments, a ZF algorithm may be a reduced order ZF algorithm. In this case, when the number of receive antennas may be larger than the number of layers, ZF may be performed on a restricted subspace in the (row) span of the channel to save on computational complexity and gain on performance. In one example, the principal directions may be used to reduce the dimension of the channel as computed in the objective function:

$$\|DHW-I\|_F \to \min$$

where D is the ZF decoder, and the channel for each UE is replaced by its top Li dominant modes using singular value decomposition (SVD). More specifically, when $D=[D_1, D_2, \ldots D_k]$ and $H=[H_1, \ldots, H_k]$, the ZF decoder may be computed as:

$$D_i^r = \sum_{i \leq Li} \sigma_i \mu_i v_i'$$

By setting $D^r=[[D_1^r, \ldots D_k^r]$, we may obtain the result, $W^r=H'D^{r'}(D'HH'D^{r'})^{-1}$.

In some embodiments, the ZF algorithm may have a complex multiplies (cMAC) computed as: $(nm)(m+1)/2+2 m^3+nm^2$ for a total cMAC of $1.5 nm^2+2 m^3$, wherein the first term is the cMAC for computing HH', the second term is the cMAC for computing the inverse $(HH')^{-1}$, and the third term is the cMAC for computing the final product.

For example, with m=16 and n=64, the cMAC may be computed as: $[(1.5*(64)*16^2)+(2*16^3)]=33000$ complex multiplications (which may be computed as approximately 105 real multiplications if defining 3MACs=1cMAC). For a 0.5 ms signal at 200 MHz having 550 RBs, the cMAC may be carried out This may be carried out 550 times. In some examples, the power consumed may be equivalent to about 110 cMAC (which may be equivalent to an 18 modulator actuator). Because the algorithm may be active once every frame, (i.e., once every 20 slots), the power consumed may be 1120th of the power that would be consumed by an 18 modulator actuator.

In some embodiments, the reduced-order ZF algorithm may have a cMAC computed as: $nm^2+nm^2+nm^2$, for a total cMAC of $3 nm^2$. The first term may be computed using Cholesky decomposition via gram Schmidt orthogonalization (i.e., QR decomposition) to compute H=RQ; the second term may be computed by setting F=HW and solving for FR'=H'; and the third term may be computed using HW=F. The computation for the reduced-order ZF algorithm is less efficient than other alternative computations.

In some embodiments, the reduced-order ZF algorithm may have a cMAC computed as: $nm^2+nm^2=2 nm^2$. The first term may be the cMAC for solving for factor S so that S'H'HS=I; and the second term may be the cMAC for setting W=H'S'S.

In some embodiments, the reduced-order ZF algorithm may be further enhanced and may have a cMAC computed as: $1.5 nm^2+m^3$. The first term includes the cMAC for computing the upper triangular matrix and the cMAC for multiplying the triangular inverse, and the second term includes the cMAC for inverting the upper triangular matrix. In an example, the cost may be about 29,000 cMACs, and similar computations provide a value of 100 units in power-adjusted terms. Thus, this approach has a smaller cMAC compared to the ZF algorithm.

In some embodiments, the enhanced reduced-order ZF algorithm may include computing the right inverse (HW=I) without an explicit computation of the Cholesky decomposition. In one example, the right inverse may be computed using a Gram-Schmidt operation to compute HW_1 as a lower triangular matrix with is on the diagonal. The computation may be include the definition:

$$H = \begin{bmatrix} H_1' \\ \vdots \\ H_m' \end{bmatrix}$$

where $W=[W_1 \ldots W_m]$ and $H'=[H_1 \ldots H_m]$, where each $H_i$ may be a column (that is, H' may be the conjugate transpose of the matrix H).

In some embodiments, the precoder, $\tilde{W}$, may be calculated so that $H\tilde{W}=I$ in which one such equation may be solved for each frequency and time resource (e.g., each resource element). The computation may include two operations: (i) calculate W so that HW is an upper triangular (m×m) matrix with is on the diagonal, and (ii) calculate the inverse of HWP=I and set $\tilde{W}$=WP.

In some embodiments, W may be computed iteratively on a column by column basis. For the initial column set, $H_1, W_1$ may be computed as shown:

$$W_1 = \frac{H_1}{|H_1|^2}$$

and $$H_1 = \begin{bmatrix} h_{11} \\ \vdots \\ h_{1n} \end{bmatrix}$$

Wherein n may be the number of power amplifiers such that $|H_1|^2=h'_{11}h_{11}+h'_{12}h_{12}+ \ldots +h'_{1n}h_{1n}$. Linear combinations of the columns of the H' matrix and the columns of the W matrix (e.g., $W_i$) may be defined such that: $F_k=H_k-W_1c_{1,k}- \ldots -W_{k-1}c_{k-1,k}$ in which $c_{ij}$ may be constants. For example, $F_2$ may be computed such that $F_2=H_2-W_1c_{12}$, and when setting $H'_1W_2=0$, the constant $c_{12}$ may be computed as $H'_1H_2$. $W_2$ may be set as $W_2=F_2/H_2'F_2$ and further iterations of F may be computed recursively using $W_i=F_i/H_i'F_i$. A truncated computation of $F_k$ may be calculated using:

$$F_k^i=H_k-W_1c_{1,k}- \ldots -W_{i-1}c_{i-1,k}$$

Based on these definitions, it may be verified that $c_{ik}=H_i'F_k^{i-1}$ (based on $H_i'W_i=I$). By setting $W_k=F_k/H_k'F_k$ an upper triangular matrix may be computed with is along the diagonal.

In some embodiments, HW may be computed as an upper triangular matrix using MatLab code as follows:

```
function W=utriagGS(H)
W=[ ]
for i=1:size(H,1)
    Hi=H(i,:)';
    F=Hi;
    for j=1:i-1
        Hj=H(j,:);
        F=F-Hj*F*W(:,j);
    end
    W=[W,F/(Hi'*F)];
end
end
```

In some embodiments, the cMAC may be higher. For instance, multiplying the quadrature amplitude modulation (QAM) symbols with the beamforming matrix may use at least 64*L multiplications per RE. In the specific example, of the reduced ZF algorithm, L=m, which uses 64*16*550*12*14*2000=190 cMAC/sec or 550 units/s in power adjusted terms. In a downlink scenario, the reduced ZF algorithm may operate during the entire transmission and thus actuation may consume energy of at least 1000× compared to that for the ZF algorithm.

In some embodiments, the processing device 708 may be configured to compute (e.g., at the BS) a second power level adjustment for the DL signal for transmission to the wireless device (e.g., a UE). In one example, the second power level adjustment may be computed by adjusting the first power level adjustment based on an antenna power constraint. In some examples, the processing device 708 may be configured to precode (e.g., at a BS), using the second power level adjustment, a DL signal for transmission to a device 714 (e.g., a UE). In some examples, the transceiver 716 may be configured to transmit the DL signal to the device 714 (e.g., a UE).

In some embodiments, the device 714 (e.g., a UE) may be configured for beamforming estimation. The device 714 may be configured to receive a downlink signal having a precoded message from a transceiver 716 (e.g., at a base station). In one example, the device 714 may comprise a processing device. The processing device may be configured to obtain a channel estimate. The channel estimate may be obtained using a reference signal including one or more of channel state information reference signal (CSI-RS), demodulation reference signal (DM-RS), phase tracking reference signal (PTRS), sounding reference signal (SRS), or the like. The channel estimate may be transmitted from the device 714 to the transceiver 716 (e.g., at a base station) using an SRS.

In some embodiments, the processing device may be configured to generate a decoder (e.g., D) by: (i) initializing the decoder using the channel estimate, and (ii) adjusting the decoder to decode the precoded message, wherein the precoded message received at the device 714 was precoded based on an antenna power constraint (e.g., using MMSE). The processing device may be configured to decode the precoded message using the decoder. The decoder may be further initialized using zero forcing applied to a precoding matrix subject to the constraint to minimize noise as measured by a ratio including one or more of: a signal to interference plus noise ratio (SINR), an interference plus noise to signal (INSR) ratio, a signal to noise ratio (SNR), or the like.

In some embodiments, a different computational methodology may be used, such as minimum mean square error (MMSE) to adjust the first power level based on the antenna power constraint. In some examples, a class of precoders may be defined as $W=\overline{W}$ diag $(p_{ij})$, where $p_{ij}$ are real scalars that indicate the adjustment in the power level for the $j^{th}$ layer of the $i^{th}$ user. The matrix, $\overline{W}$, may be defined using ZF (e.g., ZF, reduced-order ZF, reduced-order ZF that has been enhanced as disclosed herein, or the like), and the power levels may be computed using MMSE.

In some embodiments, a precoder may be defined as $W=[W_i]$ in the loop of a communication model. The received signal at user, i, may be computed as:

$$Y_i = H_i \Sigma_j W_j x_j + Z_i$$

where: (i) $x_i=(x_{il})\in$ (channel)$L_i$ may be the intended message for user, i, having $L_i$ layers, (ii) $Z_i$ may be the sum of inter-cell interference and thermal noise at user i, and (iii) $H_i$ may be the true channel.

In some embodiments, the BS may compute the received signal at user, i, as:

$$Y_i = \hat{H}_i \sum_j W_j x_j + \Delta_i \sum_j W_j x_j + Z_i$$

where $\Delta_i = H_i - \hat{H}_i$ is the channel estimation error (based on the premise that the channel may be learned using reference signals that are independent of the message, $x_j$). For example, the SRS may be used to provide the BS with a channel estimate independently of the message, $x_j$. Defining $W_{i,\ell}$ as the precoder for the $\ell^{th}$ layer of user i and $D_{i,\ell}$ for its decoder, the estimated symbol at user i for layer 1 may be computed as:

$$\hat{x}_{il} = D_{il} Y_i = D_{il} \hat{H}_i W_{il} x_{il} + D_{il} \hat{H}_i \Sigma_{r,j\neq i} W_{jr} x_{jr} + D_{il} \Delta_i \Sigma_{j,r} W_{jr} x_{jr} + D_{il} Z_i.$$

In some embodiments, assuming the UE has a perfect knowledge of the channel (because of higher and more detailed resolution of the downlink pilots), the decoder may be defined such that $D_{il} H_i W_{i,\ell} = 1$. Thus, after re-arrangement, the estimated symbol at user i at layer 1 may be computed as:

$$\hat{x}_{il} = D_{il} Y_i = x_{il} + D_{il} \hat{H}_i \Sigma_{r,j\neq i} W_{jr} x_{jr} + D_{il} \Delta_i \Sigma_{j,r} W_{jr} x_{jr} + D_{il} Z_i,$$

where the Ni may be defined as $D_{il} \hat{H}_i \Sigma_{r,j\neq i} W_{jr} x_{jr} + D_{il} \Delta_i \Sigma_{j,r} W_{jr} x_{jr} + D_{il} Z_i$.

Assuming that $|x_{il}|=1$, the bound on the interference plus noise to signal (INSR) ratio may be computed as:

$$\text{INSR}_i = \text{var}(N) \leq \Sigma_{j\neq i, r \leq L_j} \|D_{il} \hat{H}_i W_{jr}\|_F^2 + \Sigma_{j,r \leq L_j} \|D_{il} \Delta_i W_{jr}\|_F^2 + \sigma_i^2 \|D_{il}\|_F^2,$$

such that the bound on the INSR ratio may be used to determine power re-allocation in beamforming.

In some embodiments, $W_{il}$ may be computed as $\sqrt{p_{il}} V_{il}$ in which $V_{il}$ may be computed using ZF (e.g., ZF, reduced-order ZF, reduced-order ZF that has been enhanced as disclosed herein, or the like). Alternatively, or in addition, the decoder may be fixed such that $D_i = (H_i W_i)^\dagger$. For a total of M UEs, the INSR may be minimized using the objective function:

minimize $\Sigma_{i \leq M} L_i \log(t_i)$ subject to the constraint:

$$\frac{1}{p_{il}} \left( \sigma_i^2 \|D_{il}\|_F^2 + \sum_{j\neq i, l \leq L_j} p_{jl} \|D_{il} \hat{H}_i V_{jl}\|_F^2 + \lambda \in_i^2 \right.$$

$$\left. \sum_{j\neq i, r \leq L_j} p_{jl} \|D_{il}\|_F^2 \|\hat{H}_i\|_F^2 \|V_{jr}\|_F^2 \right) \leq t_i$$

and subject to the constraints:

$$p_{il} \geq 0$$

$$t_i \geq 1/256$$

$$\sum p_{il} \|e_k V_{il}\|^2 \leq \left(\frac{1}{NR}\right) \quad k = 1 \ldots N,$$

where N is the number of antennas, $e_k$ is a unit row basis vector, R is the total number of RBs available for beamforming, $\epsilon_i = \|\Delta_i\|_F / \|H_i\|_F$, $\lambda$ is a regularization parameter (e.g., $\lambda=0.1$), and $\sigma$ is the noise level.

In some embodiments, the signal received at the $i^{th}$ user may be defined using $Y_i = H_i \Sigma_j W_j x_j + Z_i$ and the estimated vector for the $i^{th}$ user may be computed as:

$$\hat{x}_i = D_i Y_i = D_i H_i \Sigma_j W_j x_j + D_i Z_i,$$

Such that the signal to interference plus noise ratio (SINR) may be computed as:

$$SINR_i(W, D) = |D_iH_iW_i|_F^2/\sigma^2|D_i|^2 + \sum_{j \neq i}|D_iH_iW_j|^2$$

In some embodiments, a power constraint may be used to adjust the power level by maximizing an SINR for an $i^{th}$ user using the objective function:

$$\text{maximize} \sum_{i \leq k} \log(SINR_i + 1)$$

subject to the constraints:

$$D_iH_i\sum W_j = I \forall i \leq k$$

$$\left|\sum e_i'W_j\right|^2 \leq \frac{1}{n} \forall i \leq n$$

where the third term adjusts for the power constraint (e.g., for the power amplifiers). In one example, a solution may be computed using local maxima calculated using gradient descent.

In some embodiments, the decoder may not be present explicitly in the objective function. That is, the derivative may be computed with respect to the decoder in terms of the precoder, and with each subsequent update, the precoder may be updated without updating the decoder. This method of computing the precoder without explicitly including the decoder in the objective function may provide performance that is similar to the performance achieved by the objective function that includes an explicit decoder in the objective function. However, the method of computing the precoder without explicitly including the decoder in the objective function may have a computational speed that is about 10× faster than including the decoder in the objective function because there are fewer variables and constraints.

In some embodiments, MMSE may be implemented using a precoder, $W_i$, and decoder, $D_i$, pair as defined:

$$D_i = D_i^+ P_i^{-1}$$

$$W_i = P_i W_i^+$$

The power scalars may be provided in a matrix, $P_i$, as defined:

$$P_i = \begin{bmatrix} \sqrt{p_{i1}} & \cdots & 0 \\ \vdots & \ddots & \vdots \\ 0 & \cdots & \sqrt{p_{iL}} \end{bmatrix}$$

where $P_i$ is a diagonal matrix. For each UE, the matrices $D_i^+$, $W_i^+$ may be computed using ZF and the power scalars, e.g., $p_i$'s may be computed using convex optimization (e.g., a geometric program). The power adjustment may be computed based on the MMSE objective function with respect to the power scalars, instead of the full precoder/decoder matrix pair.

In some embodiments, a coverage-based MMSE may be used to increase a wireless coverage area relative to a baseline wireless coverage area in which ZF is used without MMSE. In some embodiments, a coverage-based MMSE may include a worst-case MMSE using ZF decoding to compute a power level adjustment to increase a wireless coverage area relative to a baseline wireless coverage area in which ZF is used. Assuming there are K users in each group, defining the $i^{th}$ UE's decoder in row form as $D_i=[D_{i1}; D_{i2}; \ldots; D_{iL}]$, and defining the precoder in column form as $W_i=[W_{i1}, \ldots, W_{iL}]$, the power constraint (i.e., $\text{minimize}_{p1, \ldots, pK} t$) may be used to compute a power level adjustment (based on the premise that the UE is using a ZF decoder such that $D_iH_iW_i=I$) such that:

$$\frac{\sigma^2|Dij|_F^2}{p_{ij}} + \sum_{k \neq i,l} p_{k,l}|D_{ji}H_iW_{il}^+|^2/p_{ij} \leq t \ \forall \ k, j$$

$$\left|\sum e_i'W_j^+\right|^2 \leq \frac{1}{n} \forall i \leq n$$

The worst-case MMSE using ZF decoding allows for an enhancement of the SINR per UE. Some or all of the UEs may have the same QAM, which increases the service quality for the worst-case UE compared to the service quality for the worst-case UE when worst-case MMSE using ZF decoding is not used, but may not allow for an increase in throughput by the same comparison. For example, the worst-case MMSE using ZF decoding may be anti-water-filling where more power goes to the lowest-quality channels (e.g., as determined using SRS) and less power goes to the highest-quality channels (e.g., as determined using SRS).

In some embodiments, a throughput-based MMSE may be used to increase average throughput level relative to a baseline throughput level in which ZF is used without MMSE. In one example, throughput-based MMSE may include an average MMSE with ZF decoding may be used to compute a power level adjustment to increase average throughput level relative to a baseline throughput level in which ZF is used. In this example, the same QAM may be maintained across layers corresponding to the same UE, but different UEs may use different QAMs. This example is water filling in which power is provided to channels based on increasing the average throughput. Assuming there are K users in each group, defining the $i^{th}$ UE's decoder in row form as $D_i=[D_{i1}; D_{i2}; \ldots; D_{iL}]$, and defining the precoder in column form as $W_i=[W_{i1}, \ldots, W_{iL}]$, the power constraint (i.e., $\text{minimize}_{p1, \ldots, pK} \Sigma_i \log t_i$) may be used to compute a power level adjustment (based on the premise that the UE is using a ZF decoder so that $D_iH_iW_i=I$) such that:

$$\frac{\sigma^2|Dij|_F^2}{p_{ij}} + \sum_{k \neq i,l} p_{k,l}|D_{ji}H_iW_{il}^+|^2/p_{ij} \leq t_i \ \forall \ k, j$$

$$\left|\sum e_i'p_{ji}W_{ji}^+\right|^2 \leq \frac{1}{n} \forall i \leq n$$

The computational complexity for average MMSE with ZF decoding may be applied in a first operation (i.e., ZF) and a second stage (i.e., average MMSE) with respect to a small number of variables (i.e., the number of variables may be the same as the number of UEs in each group, which may be e.g., 3-4 UEs per group). Consequently, least squares or a different Newton-based method may compute the power adjustment using a reduced computational complexity relative to other methods.

In some embodiments, a robust MMSE may include a robust average MMSE with ZF decoding that may be used to compute a power level adjustment to: (i) increase average throughput level relative to a baseline throughput level in which ZF is used without MMSE, and (ii) to increase the robustness of the average throughput level relative to a baseline throughput level in which ZF is used without MMSE. In this example, as was the case for average MMSE with ZF decoding, the same QAM may be maintained across layers corresponding to the same UE, but different UEs may use different QAMs. Assuming there are K users in each group, defining the $i^{th}$ UE's decoder in row form as $D_i = [D_{i1}; D_{i2}; \ldots; D_{iL}]$, and defining the precoder in column form as $W_i = [W_{i1}, \ldots, W_{iL}]$, the power constraint (i.e., $\text{minimize}_{p1, \ldots, pK} \Sigma_i \log t_i$) may be used to compute a power level adjustment (based on the premise that the UE is using a ZF decoder so that $D_i H_i W_i = I$) subject to the constraints that:

$$\frac{\sigma^2 |Dij|_F^2}{p_{ij}} + \sum_{k \ne i, l} p_{k,l} |D_{ji} H_i W_{il}^+|^2 / p_{ij} + \lambda_i \le t_i \ \forall k, j$$

$$\left| \sum e_i' p_{ji} W_{jl}^+ \right|^2 \le \frac{1}{n} \ \forall i \le n$$

The robust-average case MMSE with ZF decoding may differ from average MMSE with ZF decoding by using a channel estimation error term (e.g., $\lambda_i$) used to compute a power adjustment that may be allow for an increased average throughput level in the presence of channel estimation errors compared to the average throughput level when average MMSE with ZF decoding is used. The robust average MMSE with ZF decoding may have a computational complexity that is similar to the computational complexity for average MMSE with ZF decoding.

Modifications, additions, or omissions may be made to the communication system 700 without departing from the scope of the present disclosure. For example, in some embodiments, the processing device 708 may be included with the transceiver 716. Alternatively, or additionally, the communication system 700 may include any number of other components that may not be explicitly illustrated or described.

Figure 8:
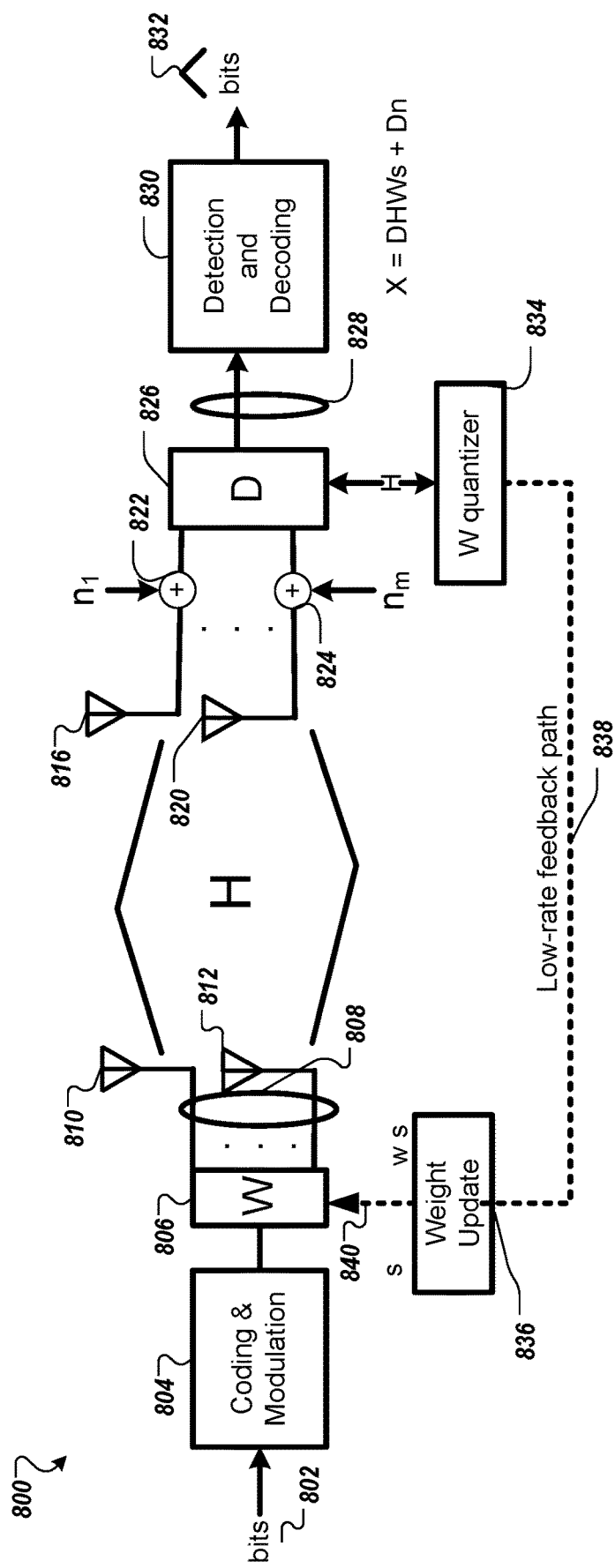
FIG. 8 illustrates an example channel model associated with beamforming estimation.

In some embodiments, as illustrated in FIG. 8, a linear transmission model for multiple in, multiple out (MIMO) communication with k UEs and p antenna ports (i.e., RF chains) may be modeled as: y=HWs+n. For this model, (i) y∈ $\mathbb{C}^m$ may be the received signal fork UEs (each UE with mi antennas and m=Σi mi) (i.e., m is the total number of receive antennas), (ii) s=[si]: where si∈ $\mathbb{C}^{\ell i}$ is the intended message for the $i^{th}$ user (assuming $\ell$ i layers). The transmit vectors may be randomly generated from a quadrature amplitude modulation (QAM) constellation; (iii) n may be the additive noise (e.g., Gaussian noise) introduced by the channel, (iv) W∈ $\mathbb{C}^{n \times \ell}$ may be the combined effect of the precoder and digital beamformer) where $\ell = \Sigma \ell$ i, and wherein n is the total number of transmit antennas; and (v) H∈ $\mathbb{C}^{m \times n}$: may be the communication channel, where m is the number of receive antennas and n is the number of transmit antennas. This linear transmission model may not model data before or after inverse fast Fourier transform (iFFT), which may not provide for effects from optical distortion, pre-fix addition, up-sampling, crest factor reduction (CFR), digital pre-distortion (DPD), power amplification, and digital-to-analog conversion or analog-to-digital conversion.

In some embodiments, a communication system 800 may be configured to receive bits, as shown at 802, process the bits, and transmit the processed bits to a device. The bits 802 may be received for coding and modulation operations, as shown in block 804. The coding and modulation operations may include one or more of error correction code (ECC) coding, quadrature amplitude modulation (QAM), layer mapping, resource element mapping, or the like. Alternatively, or in addition, the processed bits may be precoded and digitally beamformed, as shown in block 806. The processed bits may undergo numerous operations 808 including one or more of orthogonal frequency division multiplexing (OFDM) modulation, processed at a digital front end, converted to analog using a digital to analog converter (DAC), and amplified at one or more power amplifier (PAs) before transmission from one or more antennas 810, 812 on the communication channel, H. Alternatively, or in addition, an analog beamformer (i.e., a phase shifter) may process the analog signal received from the PAs before transmission.

In some embodiments, the UE may receive a signal, y, on the communication channel, H, and form an estimate x=Dy of the transmitted QAM symbols and pass the estimate to an error correction code (ECC) decoder to provide bits, as shown at 832. The signal received at the one or more antennas 816, 820 may further include additive noise (e.g., 822, 824) introduced by each channel. The signal may be demodulated and converted to digital using an analog to digital converter (ADC). The resulting signal may be decoded, using a decoder, D, as shown in block 826. The decoded signal may be processed further, as shown in block 828, and detected and decoded as shown in block 830 to provide estimated bits, as shown in block 832.

In some embodiments, the low-rate feedback path 838 may contain quantized channel state information (CSI) related information that may be reported back to the BS by the receiving device, as generated at block 834. The quantized CSI-related information may be channel quality indicator (CQI), precoding matrix index (PMI), or the like, as used in codebook-based CSI. The low-rate feedback path 838 may provide a weight update 840 that the precoder, W, at block 806 may be used in beamforming. That is, the intended messages may be weighed by a weight, w, that is provided using the low-rate feedback path 838.

In some embodiments, the decoded message, x, may be computed as: DHWs+Dn, where D is the decoding operation, H is the communication channel, W is the precoding operation, s is the message intended for the UE, and n is the additive Gaussian noise introduced by the communication channel H.

In some embodiments, the linear transmission model described herein may provide a model for a fixed time and frequency resource (i.e., a particular resource element (RE). The linear transmission model may be further indexed by the number of REs available during one transmission. Thus, the communication channel, $\mathbb{C}$, may be defined by: (i) transmit antenna mi and receive antenna $r_i$, (ii) n, the Gaussian noise introduced into the communication channel, (iii) the number of subcarriers, q, and (iv) f, the number of OFDM symbols used in one transmission. That is, there may be one communication channel for each RE in the resource grid.

Figure 9:
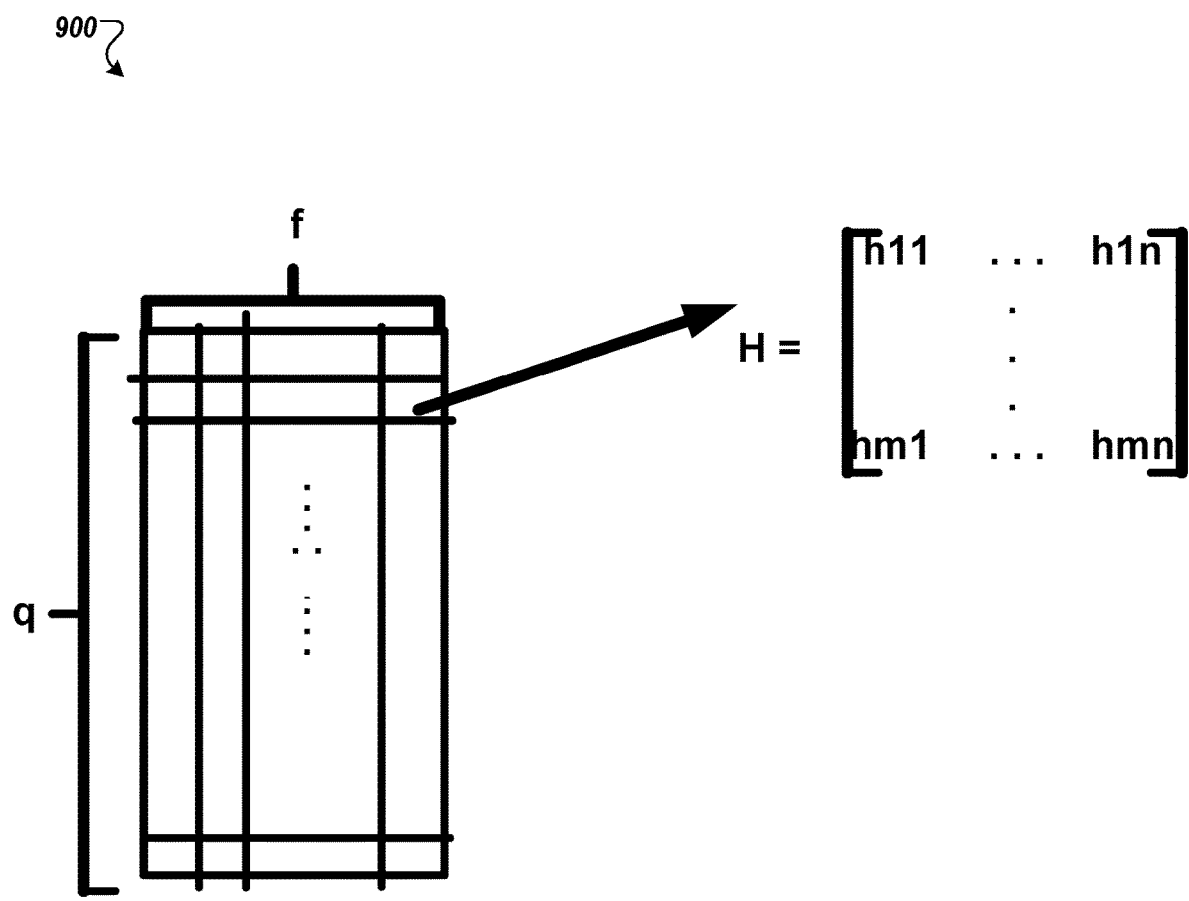
FIG. 9 illustrates an example resource grid associated with beamforming estimation.

In some embodiments, as illustrated in FIG. 9, a grid comprising q subcarriers and f OFDM symbols may provide a channel H for a fixed q and a fixed f. That is, each combination off and q may be associated with a particular channel, H, that may have m rows based on the number of transmit antennas and n columns based on the number of receive antennas. In one example, for a 200 MHz signal in a 3GPP fifth generation (5G) network, q may have a value of the product of 550 (i.e., 275 RBs in 100 MHz and therefore 550 RBs in 200 MHz) and 12 (i.e., number of subcarriers) and f may have the value of 14 OFDM symbols per slot.

In some embodiments, the channels may be correlated but are not necessarily identical. The channels may differ for various reasons including: (i) propagation physics (e.g., variations with respect to center frequency causing different phase shifts at different frequencies), (ii) multi-path effects (e.g., frequency selective channel gain), (iii) Doppler effects (e.g., time selective channel gain), or (iv) the stochastic effects (channel models that are cluster based in which each geometric ray is replaced by a cluster of random rays whose statistics may be driven by geometry).

In at least some embodiments, only the data part of the channel may be modeled. Additionally or alternatively, the non-data parts of the channel (e.g. synchronization signals and CSI-RS) may also be modeled.

Figure 10:
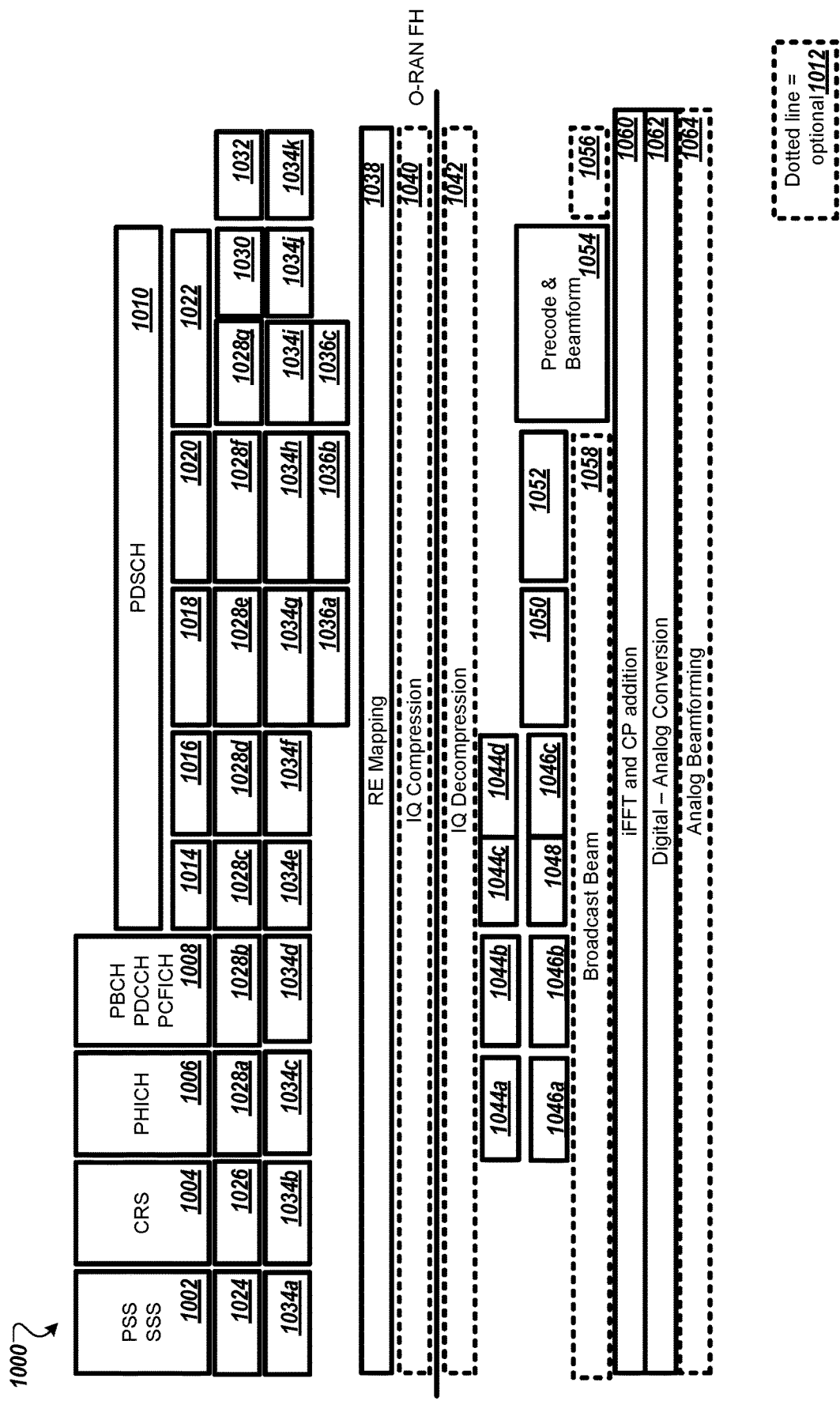
FIG. 10 illustrates a block diagram of an example signal flow associated with beamforming estimation.

In some embodiments, as illustrated in FIG. 10, a 3GPP 5G signal chain in the downlink is provided as an example. A signal may be generated as a synchronization signal (e.g., a primary synchronization signal (PSS) or a secondary synchronization signal (SSS), as in block 1002, or a cell-specific reference signal (CRS), as in block 1004). Various control channels may be used to carry control information, such as: (a) a physical hybrid automatic repeat request (ARQ) indicator channel (PHICH) (to indicate the reception of a physical downlink shared channel (PDSCH) transmission in LIE), as shown in block 1006, (b) a physical broadcast channel (PBCH) (to carry a master information block (MIB), as in block 1008, (c) a physical downlink control channel (PDCCH) (to carry downlink control information (DCI), as in block 1008, and (d) physical control format indicator channel (PCFICH) (to carry information about OFDM symbols in the time domain and the frequency domain), as in block 1008.

In other embodiments, data may be transmitted on the PDSCH, as in block 1010. The data may be transmitted using a number of transmission modes including: (i) transmission mode 1 (1 TX), as in block 1014, (ii) transmit diversity (TxD), as in block 1016, (iii) spatial multiplexing large delay cyclic delay diversity (SM LD CDD), as in block 1018, (iv) spatial multiplexing no cyclic delay diversity (SM No CDD), as in block 1020, and (v) UE Specific transmission mode, as in block 1022, or the like.

In some embodiments, the synchronization signals may be generated, as in block 1024a. The sequences for the CRS may be generated, as in block 1026. The control channels and the data channels may carry signals that may be scrambled, as in block 1028a for a PHICH, or as in block 1028b for a PBCH, PDCCH, PCFICH, or as in block 1028c for a 1 TX transmission mode, or as in block 1028d for a TxD transmission mode, or as in block 1028e for an SM LD CDD transmission mode, or as in block 1028f for an SM No CDD transmission mode, or as in block 1028g for a UE-specific transmission mode. For a PDSCH channel used with a UE specific transmission mode, a demodulation reference signal (DM-RS) may be generated as in block 1030. Alternatively, or in addition, a channel state information reference signal (CSI-RS) may be generated as in block 1032.

In some embodiments, after signal generation, sequence generation, scrambling, or reference signal generation for each particular case, the resulting digital signal may be QAM modulated, as in block 1034a to 1034k. For particular transmission modes (e.g., SM LD CDD, SM No CDD, and UE specific) layer mapping may further process the digital signal as in block 1038. The digital signal may also be mapped to resource elements, as in block 1038. Additionally, IQ compression and/or IQ decompression may be used, as in block 1040 and block 1042.

In some embodiments, the digital signal may be further mapped to layers, as in blocks 1044a to 1044d. The signal may be precoded based on the particular channel and transmission mode. That is: (i) transmit diversity precoding may be used for the PHICH, the PBCH, the PDCCH, and the PCFICH, as in blocks 1046a and 1046b, (ii) transmission mode 1 precoding may be used for the PDSCH used in a transmission mode 1, as in block 1048, (iii) transmit diversity precoding may be used for the PDSCH used in a transmit diversity transmission mode, as in block 1046c, (v) SM LD CDD precoding may be used for the PDSCH used in an SM LD CDD transmission mode, as in block 1050, and (vi) SM No CDD precoding may be used for the PDSCH used in an SM No CDD transmission mode, as in block 1052. Precoding and beamforming may also be used when a UE-specific transmission mode is used for a PDSCH, as in block 1054. Beamforming by itself may be used with a CSI-RS, as in block 1056. In some examples, an optional broadcast beam 1058 may be used for common channels or signals (e.g., PSS, SSS, CRS, PHICH, PBCH, PDCCH, PCFICH, non-UE specific PDSCH, or the like).

In some embodiments, the digital signal may be orthogonal frequency divisional multiplex (OFDM) modulated using an iFFT to generate an OFDM signal in digital form, as in block 1060. A cyclic prefix (CP) may be added into the guard intervals between the OFDM symbols. The OFDM signal may drive a digital to analog converter (ADC) to generate an analog signal, as in block 1062. The analog signal may undergo analog beamforming, as in block 1064. The analog signal may be transmitted over the air after up-conversion to a higher frequency and amplification by a power amplifier to be received by a receiver, such as a UE.

Figure 11:
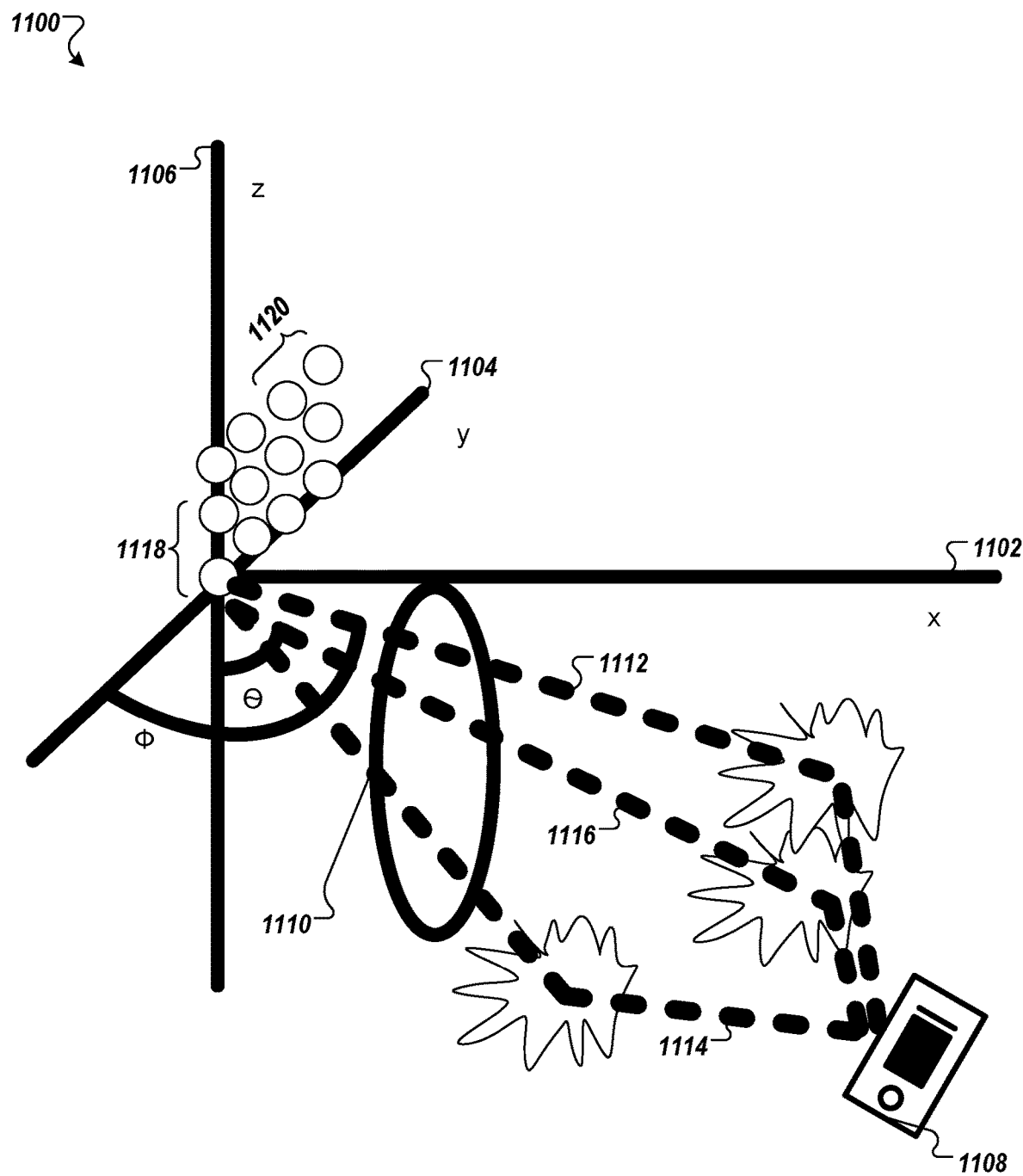
FIG. 11 illustrates an example channel model associated with beamforming estimation.

In some embodiments, as illustrated in FIG. 11, a communication channel may be modeled for each transmit/receive antenna pair (e.g., 1112, 1114, and 1116). In this example, some or all paths/rays along which the signal may be directed to the handset 1108 may be modeled with a delay value and a gain value. The model may be constructed for the center of the transmit array (e.g., the origin of the graph) and then extrapolated to the remaining arrays based on geometric considerations (e.g., 1118 is the distance between the center of the array and an offset in a positive z (1106) direction, and 1120 is the distance between a first and second offset in the y (1104) direction, and offsets may also be computed in the x (1102) direction). The angular offsets with respect to each axis (e.g., for y as shown by $\Phi$, and for z as shown by $\theta$) may also be used to extrapolate to the remaining arrays based on geometric considerations. The channel gain from the transmit antenna, t, to the receive antenna, r, at a frequency, f, may be computed as: $h_{t,r}(f) = \Sigma_l \alpha^l_{t,r} \exp(2\pi \tau^l_{t,r} f)$, in which the sum is computed over all possible paths (e.g., 1110 groups the three paths 1112, 1114, and 1116 which may be used to compute the channel gain). The channel gain may be estimated per each antenna pair (e.g., each possible path) for each resource element.

Figure 12:
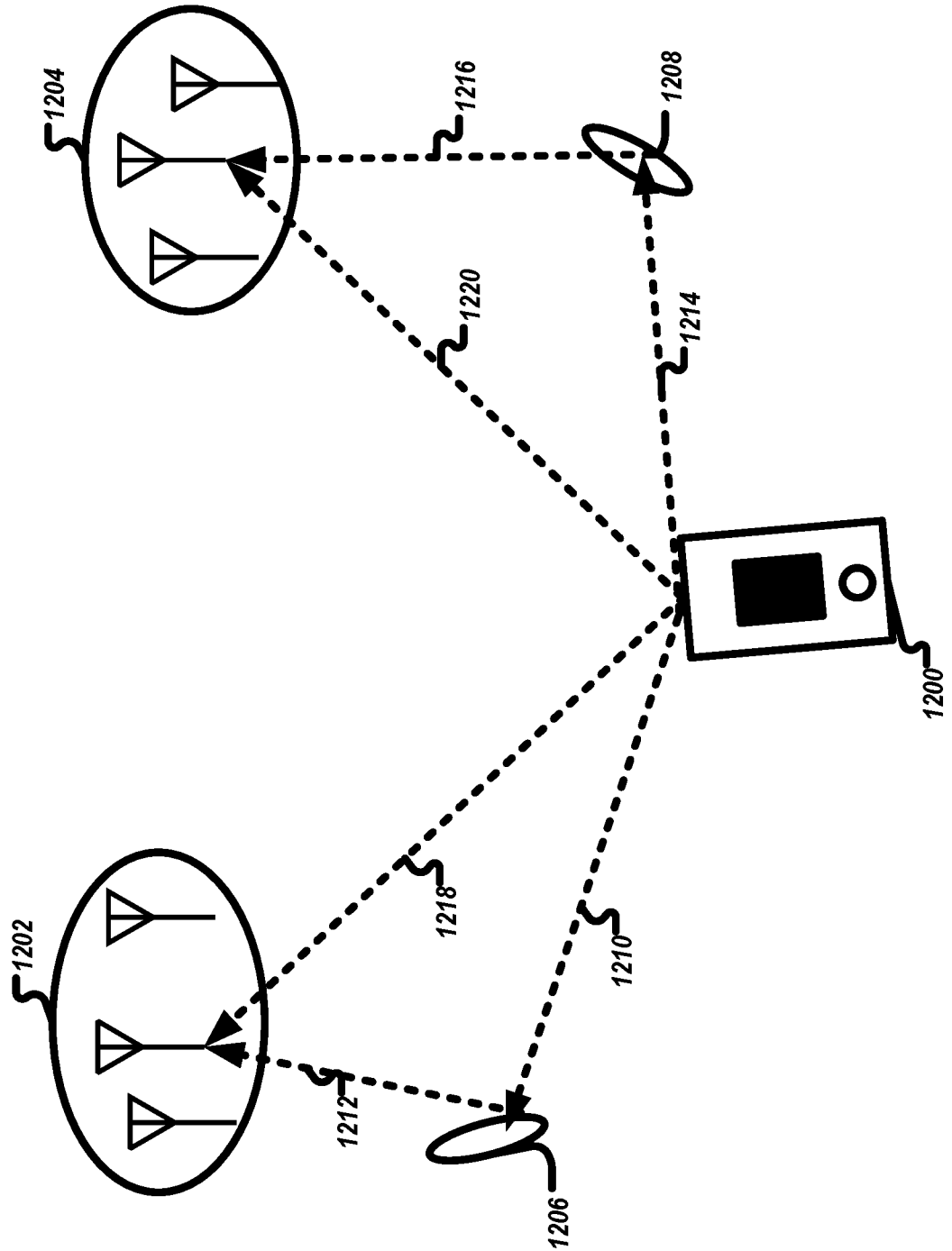
FIG. 12 illustrates an example channel mapping associated with beamforming estimation.
Figure 13:
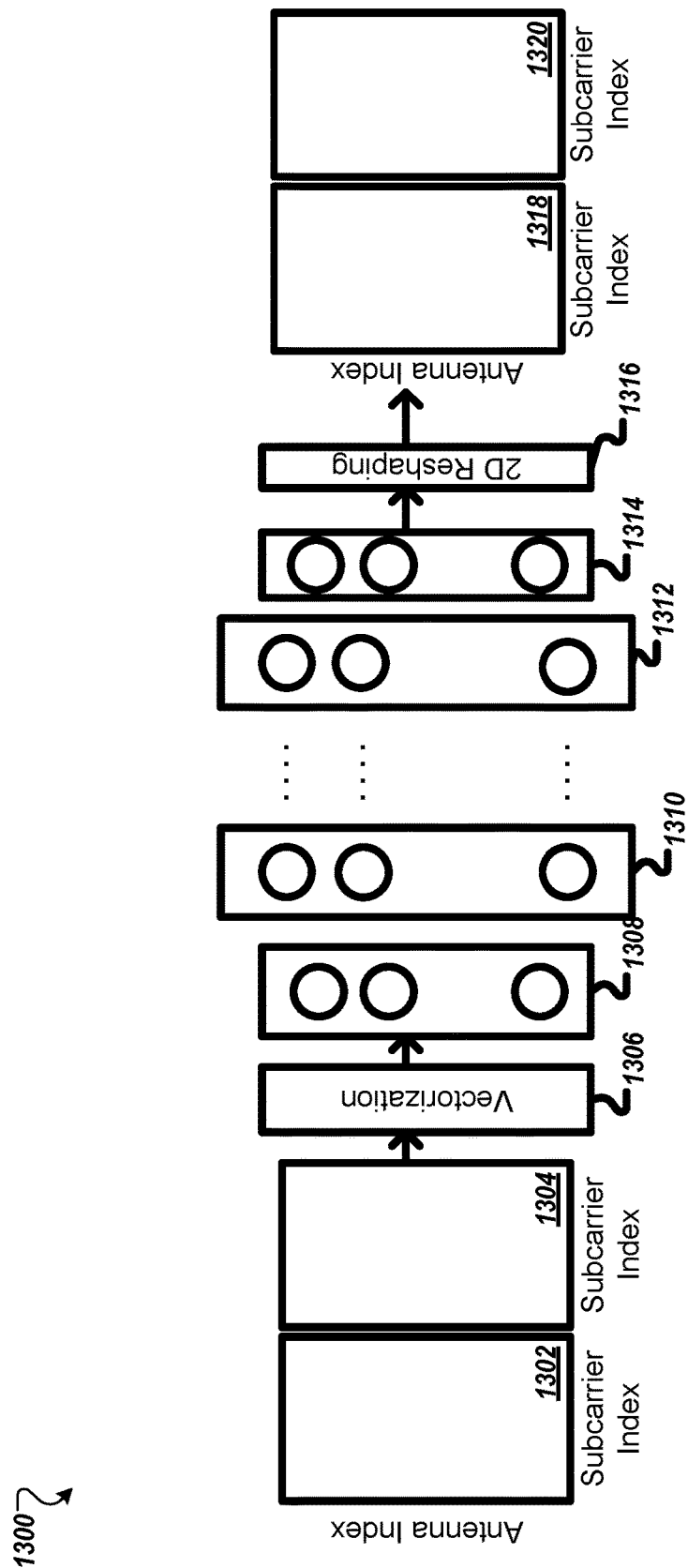
FIG. 13 illustrates an example channel mapping associated with beamforming estimation.
Figure 14:
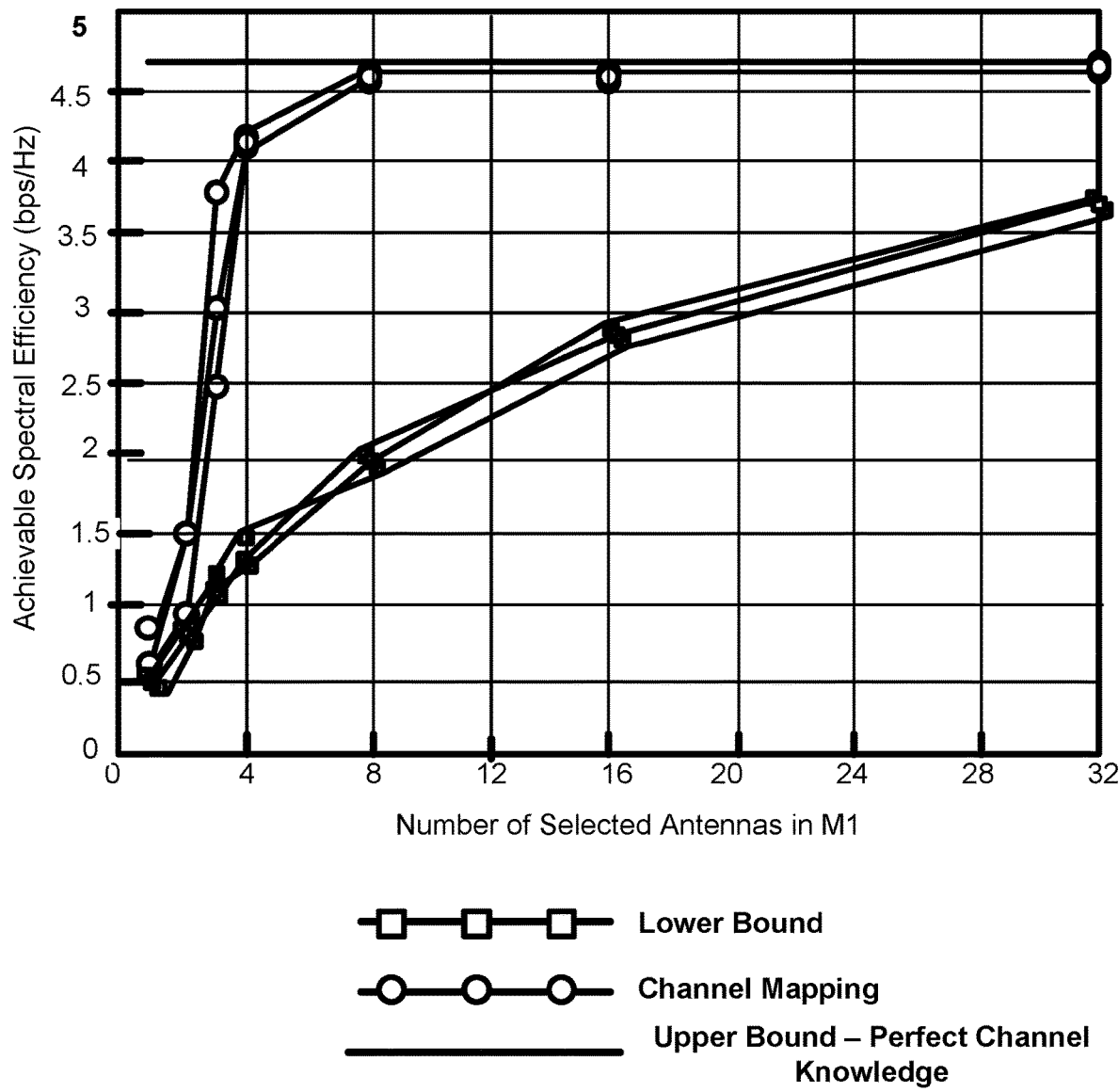
FIG. 14 illustrates a graph of an example channel mapping associated with beamforming estimation.

In some embodiments, as illustrated in FIGS. 12 to 14, extrapolation may be performed between antennas and frequencies. In one example, codebook-based estimation may be used to determine the channel in the beam space for a large number of antennas. A subset of the antennas may be used to extrapolate to a full matrix by mapping channels in space and frequency.

In some embodiments, the multipath properties of the transmission paths between a base station and a UE may be used to map a channel from a first set of antennas at a first frequency to a second set of antennas at a second frequency. As illustrated in FIG. 12, a user equipment 1200 may be configured to communicate with a first set of antennas 1202 at a first frequency over a first 1210, 1212 and second 1218 transmission path and a second set of antennas 1204 at a second frequency over a third 1214, 1216 and fourth 1220 transmission path. The first set of antennas 1202 and the second set of antennas 1204 may be co-located or distributed. A channel mapping may associate the first set of antennas 1202 with the second set of antennas 1204. The first transmission path may be re-directed by an obstacle (e.g., 1206) so that the first transmission path comprises a path 1210 and another path 1212. The third transmission path may be re-directed by an obstacle (e.g., 1208) so that the third transmission path comprises a path 1214 and another path 1216.

In some embodiments, a neural network 1300 may be used to map the channel as illustrated in FIG. 13. As shown, data associated with the first and second transmission paths between a UE and a first set of antennas may be categorized by subcarrier index and antenna index, as shown in block 1302 and block 1304. The data may be subject to vectorization, as shown in block 1306, processed through multiple layers 1308, 1310, 1312, 1314 of a neural network, and further processed through 2D reshaping, as in block 1316, to generate mapped data associated with the first and second transmission paths between the UE and a second set of antennas that may be categorized by subcarrier index and antenna index, as shown in block 1318 and 1320.

An example of channel mapping based on the number of selected antennas in the first set of antennas and the achievable spectral efficiency (bits per second (bps)) per Hertz (Hz)) is provided in FIG. 14. The lower bound method, as shown in triplicate, shows that the achievable spectral efficiency increases linearly as the number of antennas in the first set of antennas increases. That is, for the lower bound method, the achievable spectral efficiency is: for one antenna, about 0.5 bps/Hz; for 2 antennas, about 0.7 bps/Hz; for 3 antennas, about 1.1 bps/Hz; for 4 antennas, about 1.3 bps/Hz; for 8 antennas, about 2.0 bps/Hz; for 16 antennas, about 2.7 bps/Hz; and for 32 antennas, about 3.7 bps/Hz.

In contrast, the channel mapping method, as shown in triplicate, shows that the achievable spectral efficiency increases exponentially to an asymptote as the number of antennas in the first set of antennas increases. That is, for the channel mapping method, the average achievable spectral efficiency is: for one antenna, about 0.7 bps/Hz; for 2 antennas, about 1.3 bps/Hz; for 3 antennas, about 3.2 bps/Hz; for 4 antennas, about 4.2 bps/Hz; for 8 antennas, about 4.6 bps/Hz; for 16 antennas, about 4.6 bps/Hz; and for 32 antennas, about 4.6 bps/Hz. The channel mapping method approaches the upper bound, which assumes perfect channel knowledge.

Figure 15:
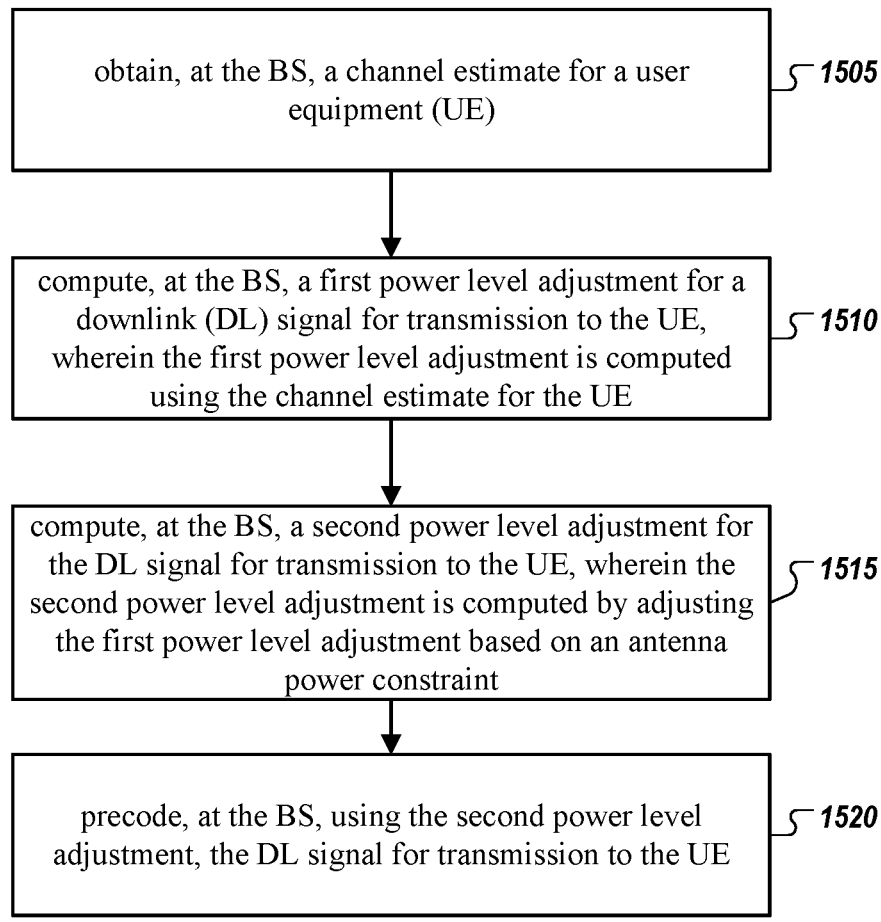
FIG. 15 illustrates a process flow of a base station (B S) used for beamforming estimation.

FIG. 15 illustrates a process flow of an example method 1500 of beamforming estimation, in accordance with at least one embodiment described in the present disclosure. The method 1500 may be arranged in accordance with at least one embodiment described in the present disclosure.

The method 1500 may be performed by processing logic that may include hardware (circuitry, dedicated logic, etc.), software (such as is run on a computer system or a dedicated machine), or a combination of both, which processing logic may be included in the processing device 708 of FIG. 7, the communication system 800 of FIG. 8, or another device, combination of devices, or systems.

The method 1500 may begin at block 1505 where the processing logic may obtain, at a BS, a channel estimate for a UE. The channel estimate may be received from the UE using an SRS.

At block 1510, the processing logic may compute, at the BS, a first power level adjustment for a downlink (DL) signal for transmission to the UE. In some embodiments, the first power level adjustment may be computed using the channel estimate for the UE. In some embodiments, the first power level adjustment may be further computed using zero forcing to minimize noise and maximize signal as measured by a ratio.

At block 1515, the processing logic may compute, at the BS, a second power level adjustment for the DL signal for transmission to the UE. In some embodiments, the second power level adjustment may be computed by adjusting the first power level adjustment based on an antenna power constraint. In some embodiments, the second power level may be computed using MMSE.

At block 1520, the processing logic may precode, at the BS, using the second power level adjustment, the DL signal for transmission to the UE.

Modifications, additions, or omissions may be made to the method 1500 without departing from the scope of the present disclosure. For example, in some embodiments, the method 1500 may include any number of other components that may not be explicitly illustrated or described.

Figure 16:
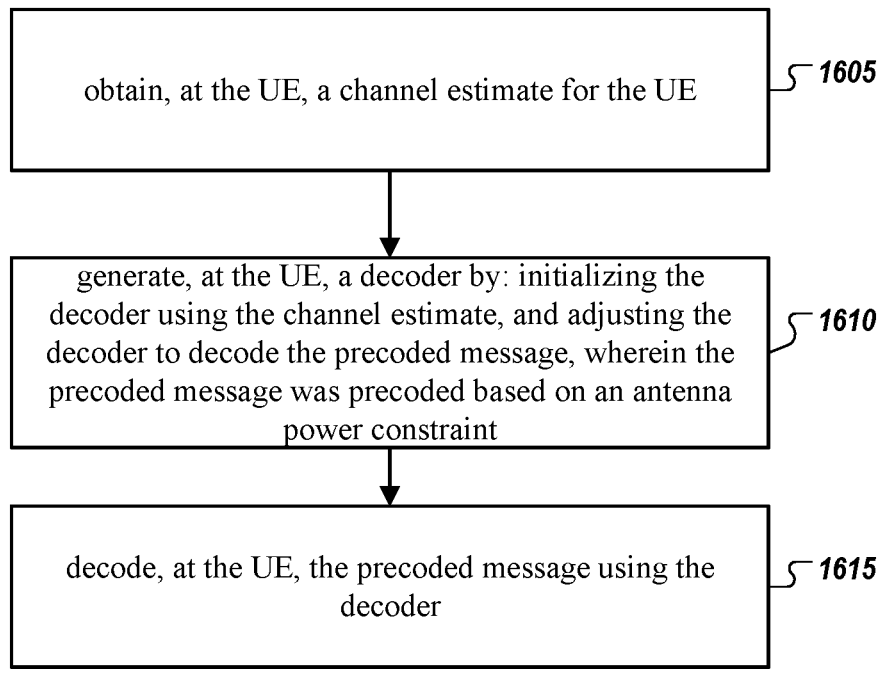
FIG. 16 illustrates a process flow of a user equipment (UE) used for beamforming estimation.

FIG. 16 illustrates a process flow of an example method 1600 that may be used for beamforming estimation, in accordance with at least one embodiment described in the present disclosure. The method 1600 may be arranged in accordance with at least one embodiment described in the present disclosure.

The method 1600 may be performed by processing logic that may include hardware (circuitry, dedicated logic, etc.), software (such as is run on a computer system or a dedicated machine), or a combination of both, which processing logic may be included in the processing device 708 of FIG. 7, the communication system 800 of FIG. 8, or another device, combination of devices, or systems.

The method 1600 may begin at block 1605 where the processing logic may obtain, at the UE, a channel estimate for the UE. In some embodiments, the channel estimate may be obtained or based on a reference signal. The channel estimate may be transmitted to the BS using the SRS.

At block 1610, the processing logic may generate, at the UE, a decoder by initializing the decoder using the channel estimate and adjusting the decoder to decode the precoded message. In some embodiments, the precoded message may be precoded based on an antenna power constraint (e.g., using MMSE). In some embodiments, the decoder may be initialized using zero forcing to minimize noise and maximize signal as measured by a ratio.

At block 1615, the processing logic may decode, at the UE, the precoded message using the decoder.

Modifications, additions, or omissions may be made to the method 1600 without departing from the scope of the present disclosure. For example, in some embodiments, the method 1600 may include any number of other components that may not be explicitly illustrated or described.

Figure 17:
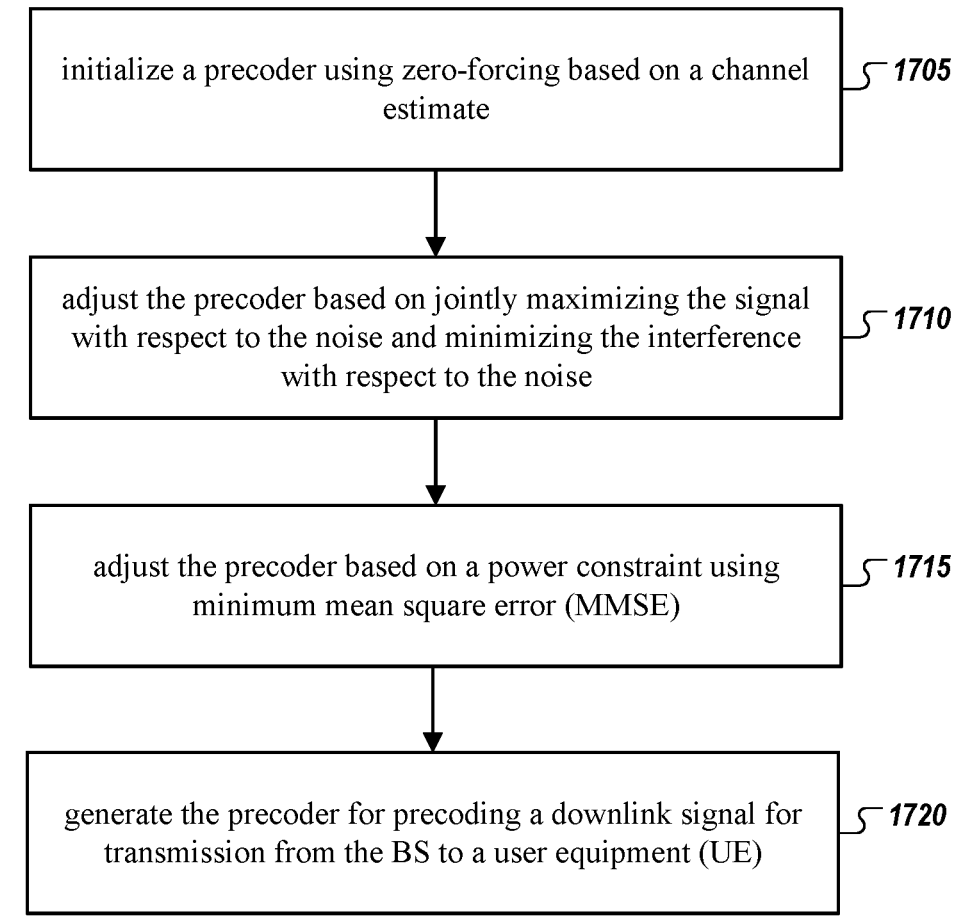
FIG. 17 illustrates a process flow for a computer readable medium used for beamforming estimation.

FIG. 17 illustrates a process flow of an example method 1700 that may be used for beamforming estimation, in accordance with at least one embodiment described in the present disclosure. The method 1700 may be arranged in accordance with at least one embodiment described in the present disclosure.

The method 1700 may be performed by processing logic that may include hardware (circuitry, dedicated logic, etc.), software (such as is run on a computer system or a dedicated machine), or a combination of both, which processing logic may be included in the processing device 708 of FIG. 7, the communication system 800 of FIG. 8, or another device, combination of devices, or systems.

The method 1700 may begin at block 1705 where the processing logic may initialize a precoder using zero-forcing based on a channel estimate. In some embodiments, the processing logic may initialize the precoder based on one or more of a number of downlink layers for a component carrier, a number of UEs, a number of transmit antenna elements, a number of receive antenna elements, a number of resource blocks available for beamforming, an error parameter, or a regularization parameter.

At block 1710, the processing logic may adjust the precoder based on jointly maximizing the signal with respect to the noise and minimizing the interference with respect to the noise. In some embodiments, the SINR may be jointly optimized with the SNR. In some embodiments, the processing logic may jointly maximize the signal with respect to noise using a signal-to-noise ratio (SNR) constraint and minimize the interference with respect to noise using a signal-to-interference-plus-noise ratio (SINR) constraint.

At block 1715, the processing logic may adjust the precoder based on a power constraint using minimum mean square error (MMSE). In some embodiments, the processing logic may project the decoder into a set of decoders associated with the set of power constrained precoders. In some embodiments, the processing logic may adjust the precoder based on a power constraint using gradient descent.

At block 1720, the processing logic may generate the precoder for precoding a downlink signal for transmission from the BS to a user equipment (UE).

In some embodiments, the processing logic may generate the precoder based on a precoding gradient and a precoding partial Hessian. In some embodiments, the processing logic may generate the decoder based on a decoding gradient and a decoding partial Hessian. In some embodiments, the processing logic may generate the precoder using minimum mean square error (MMSE) and an interference-plus-noise-to-signal ratio (INSR) constraint or an SNR constraint. In some embodiments, the processing logic may generate the precoder based on one or more of a number of downlink layers for a component carrier, a total number of UEs, a total number of transmit antenna elements, a total number of receive antenna elements, a total number of resource blocks (RBs) available for beamforming, an error parameter, or a regularization parameter.

In some embodiments, the processing logic may initialize a decoder using a channel estimate and the precoder. In some embodiments, the processing logic may generate the decoder based on a decoding gradient and a decoding partial Hessian. In some embodiments, the processing logic may project the decoder into a set of decoders associated with the set of power constrained precoders.

Modifications, additions, or omissions may be made to the method 1700 without departing from the scope of the present disclosure. For example, in some embodiments, the method 1700 may include any number of other components that may not be explicitly illustrated or described.

For simplicity of explanation, methods and/or process flows described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

Figure 18:
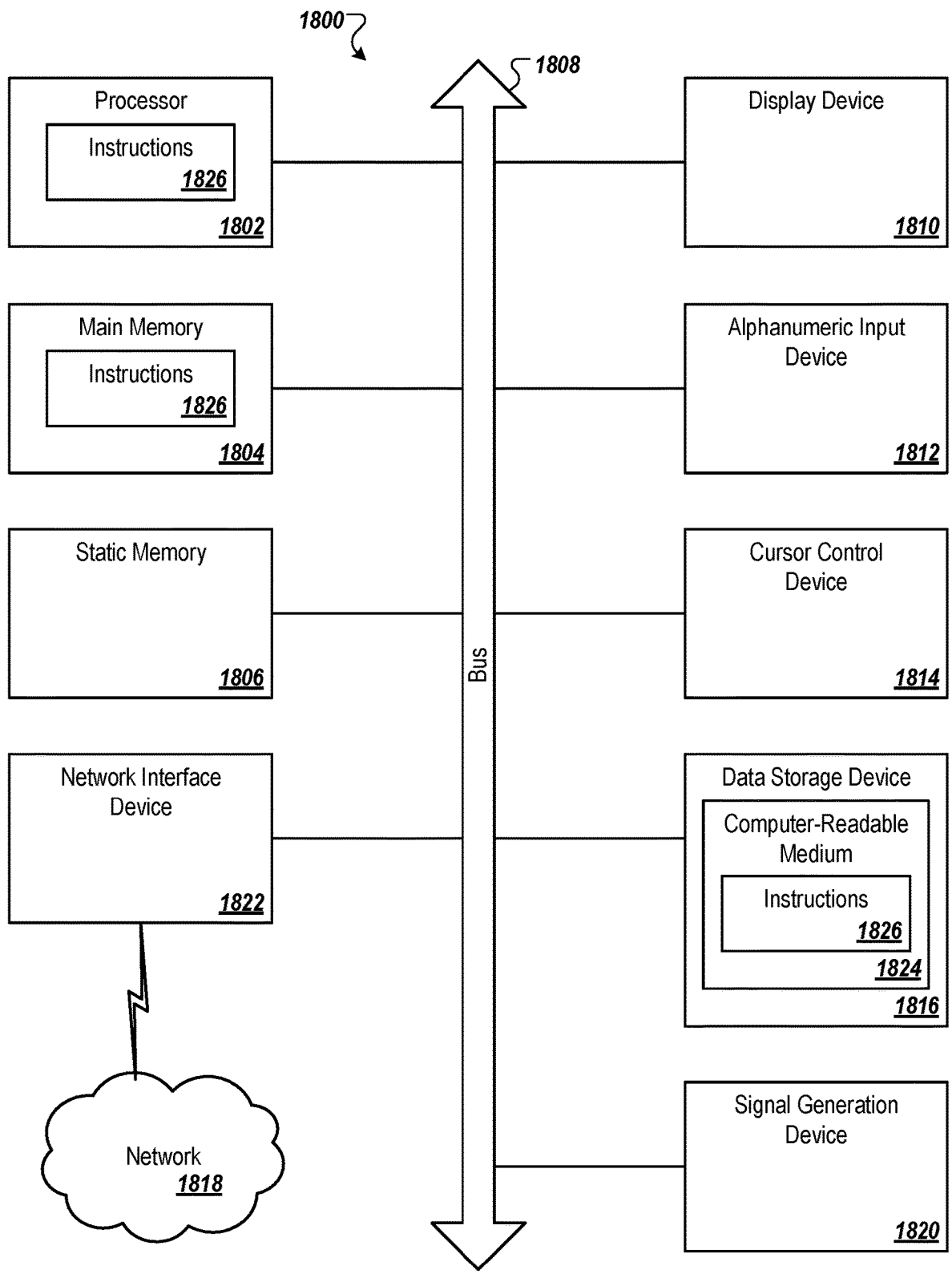
FIG. 18 illustrates a diagrammatic representation of a machine in the example form of a computing device within which a set of instructions, for causing the machine to perform any one or more of the methods discussed herein, may be executed.

FIG. 18 illustrates a diagrammatic representation of a machine in the example form of a computing device 1800 within which a set of instructions, for causing the machine to perform any one or more of the methods discussed herein, may be executed. The computing device 1800 may include a rackmount server, a router computer, a server computer, a mainframe computer, a laptop computer, a tablet computer, a desktop computer, or any computing device with at least one processor, etc., within which a set of instructions, for causing the machine to perform any one or more of the methods discussed herein, may be executed. In alternative embodiments, the machine may be connected (e.g., networked) to other machines in a LAN, an intranet, an extranet, or the Internet. The machine may operate in the capacity of a server machine in client-server network environment. Further, while only a single machine is illustrated, the term "machine" may also include any collection of machines that individually or jointly execute a set (or multiple sets) of instructions to perform any one or more of the methods discussed herein.

The example computing device 1800 includes a processing device (e.g., a processor) 1802, a main memory 1804 (e.g., read-only memory (ROM), flash memory, dynamic random access memory (DRAM) such as synchronous DRAM (SDRAM)), a static memory 1806 (e.g., flash memory, static random access memory (SRAM)) and a data storage device 1816, which communicate with each other via a bus 1808.

Processing device 1802 represents one or more general-purpose processing devices such as a microprocessor, central processing unit, or the like. More particularly, the processing device 1802 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1802 may also include one or more special-purpose processing devices such as an application specific integrated circuit (ASIC), a field programmable gate array (FPGA), a digital signal processor (DSP), network processor, or the like. The processing device 1802 is configured to execute instructions 1826 for performing the operations and steps discussed herein.

The computing device 1800 may further include a network interface device 1822 which may communicate with a network 1818. The computing device 1800 also may include a display device 1810 (e.g., a liquid crystal display (LCD) or a cathode ray tube (CRT)), an alphanumeric input device 1812 (e.g., a keyboard), a cursor control device 1814 (e.g., a mouse) and a signal generation device 1820 (e.g., a speaker). In at least one embodiment, the display device 1810, the alphanumeric input device 1812, and the cursor control device 1814 may be combined into a single component or device (e.g., an LCD touch screen).

The data storage device 1816 may include a computer-readable storage medium 1824 on which is stored one or more sets of instructions 1826 embodying any one or more of the methods or functions described herein. The instructions 1826 may also reside, completely or at least partially, within the main memory 1804 and/or within the processing device 1802 during execution thereof by the computing device 1800, the main memory 1804 and the processing device 1802 also constituting computer-readable media. The instructions may further be transmitted or received over a network 1818 via the network interface device 1822.

While the computer-readable storage medium 1824 is shown in an example embodiment to be a single medium, the term "computer-readable storage medium" may include a single medium or multiple media (e.g., a centralized or distributed database and/or associated caches and servers) that store the one or more sets of instructions. The term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media.

EXAMPLES

The following provide examples of the performance characteristics according to embodiments of the present disclosure.

Figure 19:
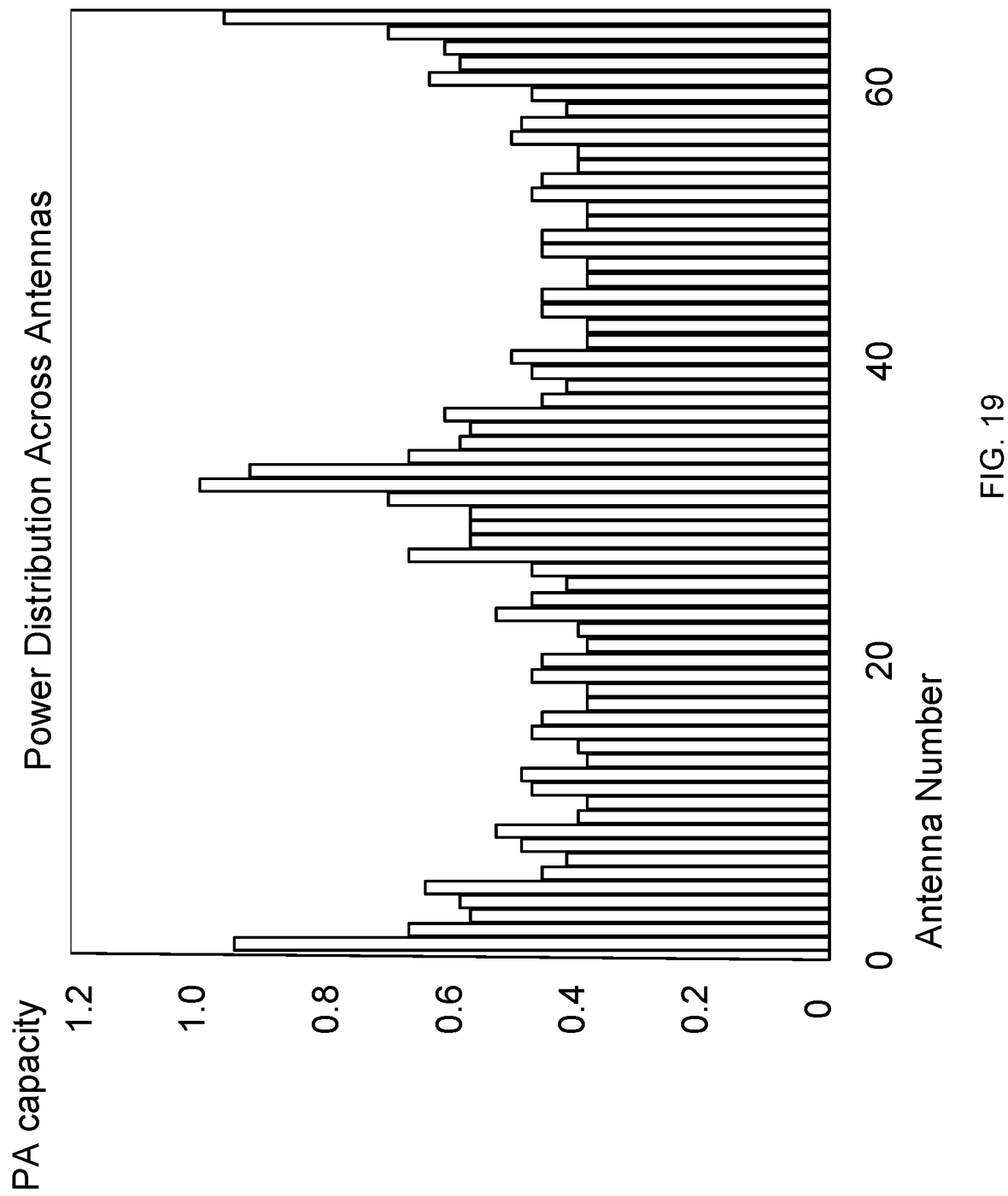
FIG. 19 illustrates an example of power distribution across transmitting antennas for regularized zero forcing.
Figure 20:
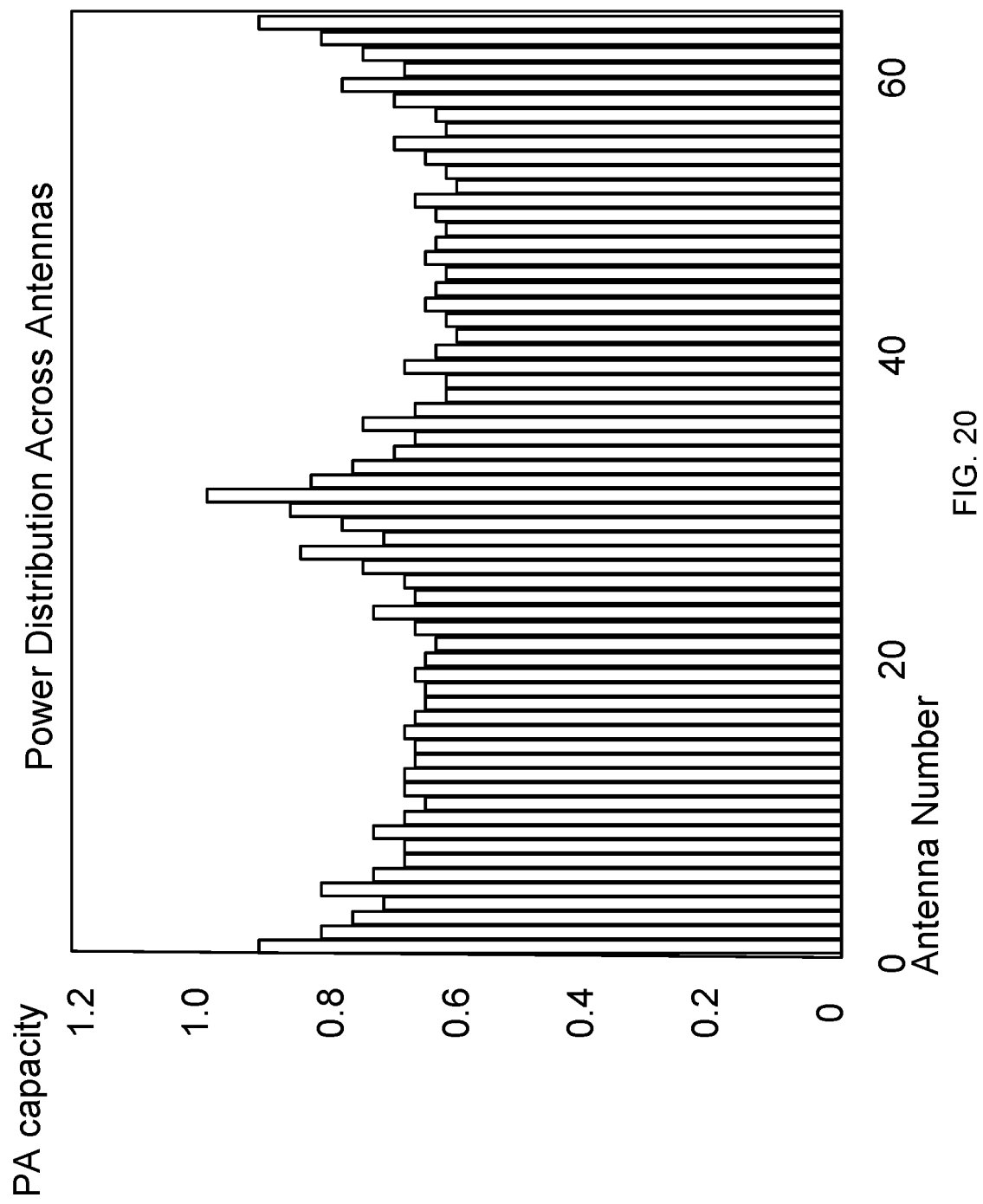
FIG. 20 illustrates an example of power distribution across transmitting antennas for regularized zero forcing.

Example 1: Power Distribution for Regularized ZF in a 4 Group Case and an 8 Group Case As illustrated in FIGS. 19 and 20, the power distribution across transmitting antennas for Regularized ZF was compared for: (i) a 100 MHz band with 4 groups, 32 UEs, 64 transmitting antennas (dual polarized and arranged in a 4×8 panel) in which each user has 4 receiving antennas and receives around 25 MHz of the spectrum, and (ii) a 100 MHz band with 8 groups, 32 UEs, 64 transmitting antennas (dual polarized and arranged in a 4×8 panel) in which each user has 4 receiving antennas and receives around 12 MHz of the spectrum.

As illustrated in FIG. 19, for 4 groups, each UE had 4 antennas and received about 25 MHz of spectrum within the 100 MHz band. Because channel variations are typically smaller within a group, the shape does not vary due to randomness introduced from the multi-user nature of the channel. Most users received 2 layers of data. Consequently, 16 layers per resource element were transmitted in FIG. 19. The power distribution shows that a few of the transmitting antennas were operating near capacity (e.g., the peaks at antenna 1, near antenna 33, and at antenna 64). However, quite a few of the transmitting antennas (e.g., antennas 6 to about 30, and about antennas 40 to 60) were operating at less than half of capacity. Consequently, the power distribution across the transmitting antennas was not operating near capacity.

As illustrated in FIG. 20, an increased number of groups (e.g., 8 groups versus 4 groups in FIG. 19), each UE had 4 antennas and received about 12 MHz of spectrum within the 100 MHz band. There was more variability from cross group diversity added to the channel and therefore the power distribution became smoother. Most users received 2 layers of data. Consequently, 8 layers per resource element were transmitted in FIG. 20. The power distribution shows that a few of the transmitting antennas were operating near capacity (e.g., the peaks at antenna 1, near antenna 33, and at antenna 64). Furthermore, quite a few of the transmitting antennas (e.g., antennas 6 to about 30, and about antennas 40 to 60) were operating at more than half of capacity and in many cases higher than about 60% capacity. Consequently, the power distribution across the transmitting antennas was not operating near capacity. In this particular example, although power was used more efficiently, overall throughout was less compared to the 4 group case because there was a decrease in spatial diversity caused by the scheduler.

Example 2: Power Distribution for Maximum Ratio Transmission in a 4 Group Case

Figure 21:
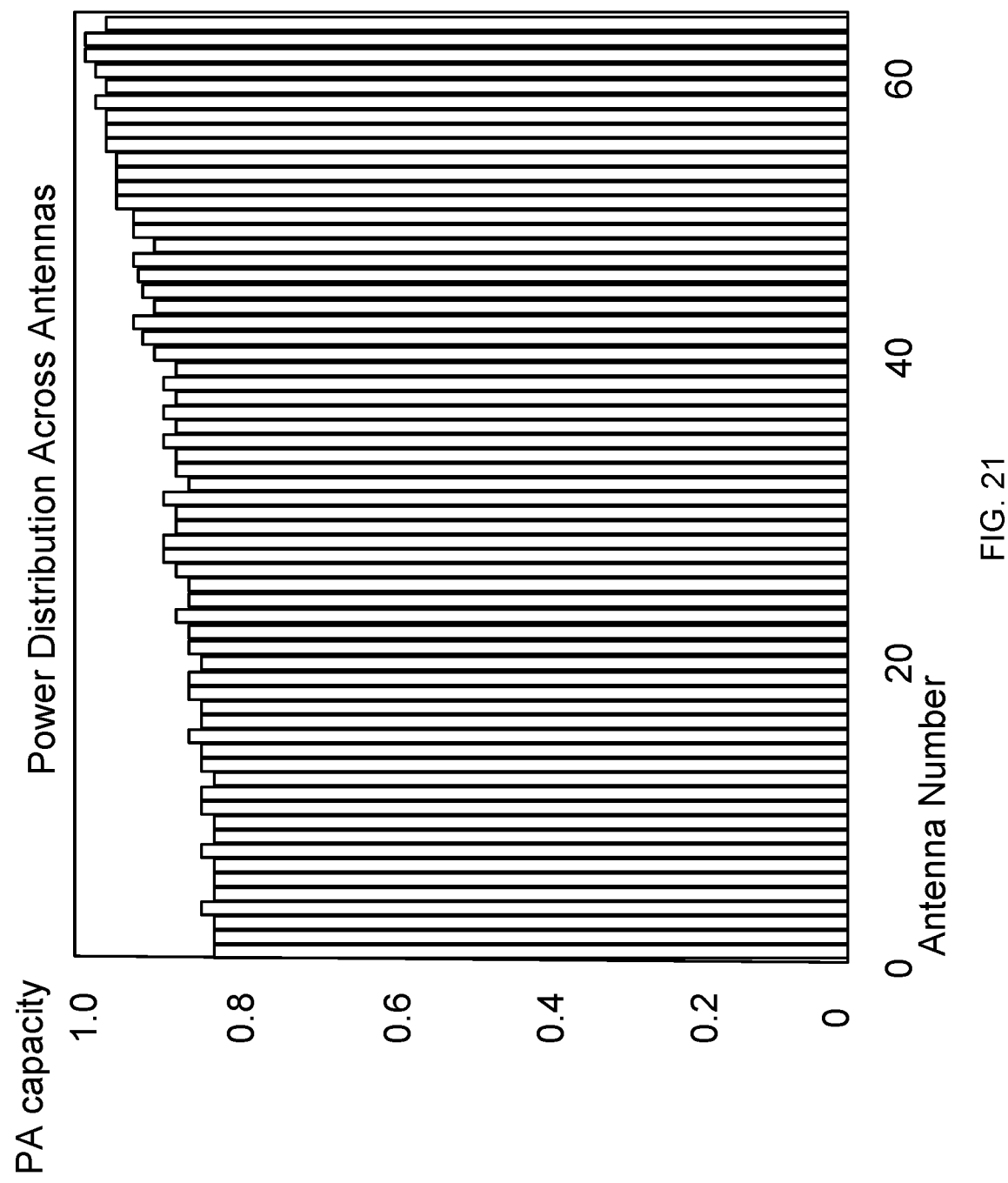
FIG. 21 illustrates an example of power distribution across transmitting antennas for maximum ratio transmission.

As illustrated in FIG. 21, the power distribution across transmitting antennas for Maximum Ratio Transmission (MRT) was displayed for a 100 MHz band with 4 groups, 32 UEs, 64 transmitting antennas (dual polarized and arranged in a 4×8 panel) in which each user has 4 receiving antennas and receives around 25 MHz of the spectrum.

For 4 groups, each UE had 4 antennas and received about 25 MHz of spectrum within the 100 MHz band. The power distribution has been equalized compared to the RZF 4-Grup case in Example 1 because more power was transmitted from each antenna and the PAs operated more efficiently. The power distribution shows that each of the transmitting antennas were operating at greater than 80% capacity (e.g., antennas numbered 1 to 64). Furthermore, quite a few of the transmitting antennas were operating at greater than about 90% capacity (e.g., antennas numbered about 40 to 64). Consequently, the power distribution across the transmitting antennas was enhanced compared to the 4-group RZF case and the 8-group RZF case. Nonetheless, the throughput was about 25% less than RZF, although the throughput was similar to ZF.

Example 3: Power Distribution for MMSE in a 4 Group Case

Figure 22:
FIG. 22 illustrates an example of power distribution across transmitting antennas for minimum mean square error.

As illustrated in FIG. 22, the power distribution across transmitting antennas for MMSE was displayed for a 100 MHz band with 4 groups, 32 UEs, 64 transmitting antennas (dual polarized and arranged in a 4×8 panel) in which each user has 4 receiving antennas and receives around 25 MHz of the spectrum.

For 4 groups, each UE had 4 antennas and received about 25 MHz of spectrum within the 100 MHz band. The power distribution was very close to uniform compared to the 4-group RZF case, the 8-group RZF case, and the 4-group MRT case. The power distribution shows that each of the transmitting antennas were operating at about 100% capacity (e.g., antennas numbered 1 to 64). Furthermore, the throughput was about 14% higher than RZF.

Example 4: Throughput Comparison

Figure 23:
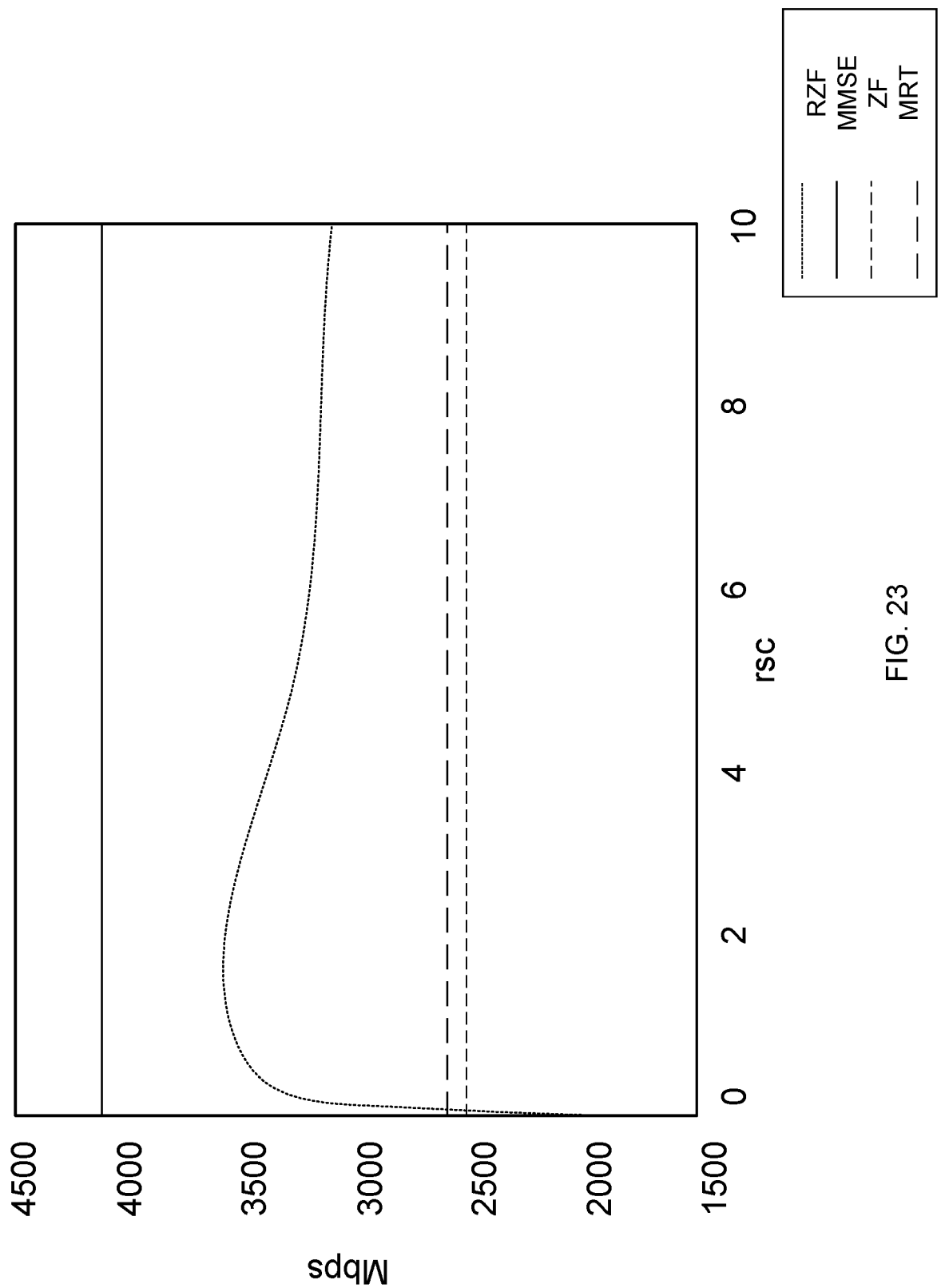
FIG. 23 illustrates throughput for zero-forcing, regularized zero-forcing, maximum ratio transmission, and minimum mean square error.

As illustrated in FIG. 23, the throughput (in megabits per second (Mbps)) was compared for the 4-group ZF case, the 4-group RZF case, the 4-group MRT case, and the 4-group MMSE case. The regularization factor was equal to $r=r_{sc} \times r_0$, in which $r_0$ was determined based on various parameters including the SNR, number of users, number of antennas, and the like).

As shown, ZF had the worst throughput relative to the other cases at about 2500 Mbps. MRT also had relatively low throughput at about 2600 Mbps that was comparable to the ZF case. RZF had a throughput that was higher relative to ZF and MRT depending on the regularization factor. The MMSE case had the highest throughput at about 4100 Mbps. Therefore, the MMSE case had an enhanced throughput compared to the ZF, RZF, and MRT cases.

Example 5: SINR Comparison Between ZF, Average MMSE, Worst-Case MMSE, Worst-Case MMSE with ZF, and Robust Average MMSE with ZF The SINR for 8 groups of 3-4 users was measured for an average case and a worst case. The SINR was defined as:

$$WSINR_i(W, D) = \min_j |D_{ij} H_i W_{ij}|_F^2 / \sigma^2 |D_{ij}|_F^2 + \sum_{j \neq i} |D_{ij} H_i W_j|_F^2$$

For each UE, the SINR was computed for its worst layer (because of QAM constraints) and for its average (inverse) worst case layer SINR per group. That is, the average (inverse) worst-layer SINR per group was computed as:

$$AIWSINR = \left(-\frac{1}{K}\right) \sum_i \log WSINR_i(W, D)$$

The worst-case (inverse) worst-layer SINR per group was computed as:

$$WIWSINR = -\min_i \log WSINR_i(W, D)$$

TABLE I

| | ZF | | Average MMSE with ZF | | Worst-Case MMSE AIWSINR/ |
|---|---|---|---|---|---|
| AIWSINR (dB) | WIWSINR (dB) | AIWSINR (dB) | WIWSINR (dB) | WIWSINR (dB) |
| −30.7475 | −23.4957 | −32.0941 | −23.8877 | −27.8781 |
| −34.5373 | −26.3529 | −35.4629 | −26.7708 | −31.3785 |
| −29.9110 | −28.1860 | −30.7024 | −27.6318 | −29.6657 |
| −37.2222 | −32.7087 | −38.0751 | −34.5161 | −36.3502 |
| −30.7703 | −28.1792 | −31.5582 | −27.9850 | −29.8514 |
| −47.6850 | −37.8295 | 48.8404 | −37.6936 | −42.2262 |
| −39.6487 | −30.9760 | −40.7654 | −33.6225 | −36.7086 |
| −31.2017 | −29.1092 | −33.2020 | −27.7493 | −31.1332 |

As shown in Table I, worst-case MMSE with ZF (computed using AIWSINR/WIWSINR) performed worse compared to the ZF as computed using the average (inverse) worst-layer (i.e., AIWSINR) but performed better compared to the ZF as computed using the worst-case (inverse) worst-layer (i.e., WIWSINR). For example, for one group, the AIWSINR/WIWSINR for the worst-case MMSE with ZF was −27.8781 dB which was worse than the corresponding value for ZF as computed using AIWSINR (i.e., −30.7475 dB). For the same group, the AIWSINR/WIWSINR for the worst-case (inverse) MMSE with ZF was −27.8781 dB which was better than the corresponding value for ZF as computed using WIWSINR (i.e., −23.4957 dB). It should be noted that the AIWSNINR and WIWSINR for the worst-case (inverse) MMSE with ZF provide the same results.

In contrast, the AIWSINR for the average MMSE with ZF was better than ZF (as measured using AIWSINR). For example, the AIWSINR for the average MMSE with ZF was measured to be −32.0941 dB for one group and for the corresponding ZF group, the AIWSINR was measured to be −30.7475. Generally, the results across groups for MMSE with ZF were up to 2 dB better than the results across groups for ZF with respect to AIWSINR.

Furthermore, the WIWSINR for the average MMSE with ZF was better than ZF (as measured using WIWSINR). For example, the WIWSINR for the average MMSE with ZF was measured to be −23.8877 dB for one group and for the corresponding ZF group, the WIWSINR was measured to be −23.4957. Generally, the results across groups for MMSE with ZF were slightly better than the results across groups for ZF with respect to WIWSINR.

TABLE II

| Worst-Case MMSE with ZF | | ZF | | Robust Average MMSE with ZF |
|---|---|---|---|---|
| AIWSINR (no error) (dB) | AIWSINR' (10% error) (dB) | AIWSINR (10% error) (dB) | WIWSINR (10% error) (dB) | AIWSINR (10% error) (dB) |
| −27.8781 | −17.9563 | −25.5473 | −20.4628 | −23.1256 |
| −31.3785 | −13.6739 | −26.3314 | −24.7768 | −25.0416 |
| −29.6657 | −24.7519 | −26.7204 | −24.9854 | −25.9464 |
| −36.3502 | −20.8808 | −28.5261 | −26.4457 | −26.2744 |
| −29.8514 | −18.4151 | −26.1046 | −25.0499 | −26.0898 |
| −42.2262 | −13.6747 | −29.2111 | −26.9239 | −26.8693 |
| −36.7086 | −11.7767 | −26.3920 | −25.3671 | −24.3994 |
| −31.1332 | −22.3219 | −29.1031 | −25.4238 | −26.5261 |

As shown in Table II, without channel estimation errors, the AIWSINR for the worst-case MMSE with ZF was better compared to the AIWSINR for the ZF as was established in the previous Table I. In contrast, when 10% channel estimation errors were inserted, the AIWSINR for the worst-case MMSE with ZF was worse than the AIWSINR for the ZF. For example, the AIWSINR for the worst case MMSE with ZF was −17.9563 for one group, and, for the corresponding group in the ZF, the AIWSINR was −25.5473. Thus, the worst-case scenario with ZF was not robust compared to ZF when channel estimation errors were inserted into the testing.

As shown in Table II, when 10% channel estimation errors were inserted, the AIWSINR for the robust average MMSE with ZF was slightly worse than the AIWSINR for the ZF but better than the AIWSINR for the worst-case MMSE with ZF. For example, the AIWSINR for the robust average MMSE with ZF was −26.0898 for one group, and, for the corresponding group in the ZF, the AIWSINR was slightly better at −26.1046. However, when compared to the worst-case MMSE with ZF, the AIWSINR for the robust average MMSE with ZF (−26.0898) was better than the AIWSINR for the worst-case MMSE with ZF (18.4151).

Example 6

In these tests, the performance characteristics of MU-MIMO network were compared between MMSE with ZF and regularized ZF, ZF, and SU-MIMO. A 100 MHz band was assumed to be distributed roughly equally among a certain number of groups (4 and 5 in our examples). The number of groups was decided by the scheduler (along with the assignment of users to the groups) to maximize performance.

Example 6-A: 64 TX and 33 UEs with 20% Channel Estimation Error

For Case 1 the comparison was performed based on the following properties of the MU-MIMO network.
64 Tx (arranged in 8×4×2),
33 UEs,
4 groups,
average number of layers: 14.75,
average channel estimation error 20%.

Figure 24:
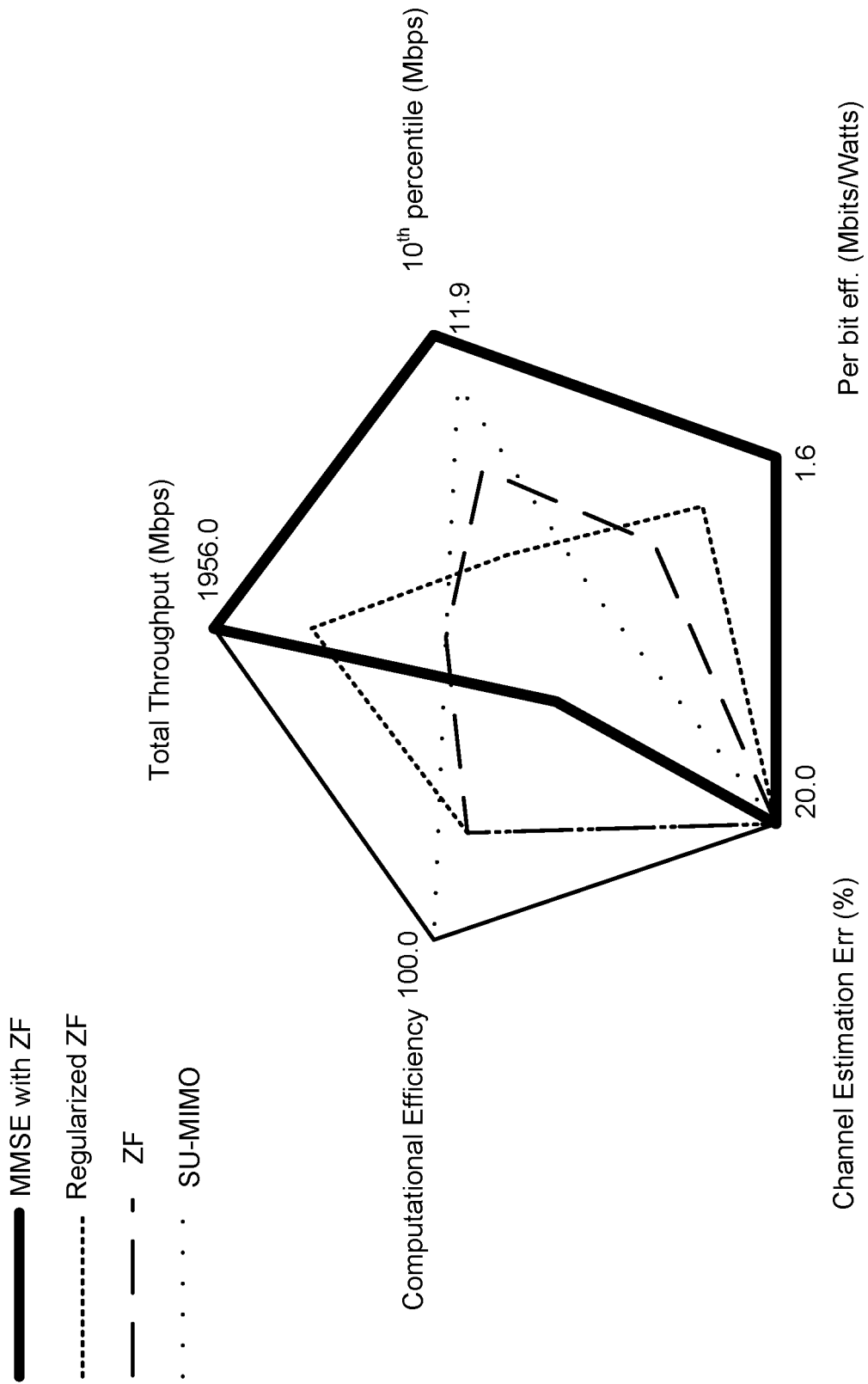
FIG. 24 illustrates an example of multi-user multiple input multiple-output (MU-MIMO) system capacity.

As shown in FIG. 24, for a channel estimation error of 20% (for MMSE with ZF, regularized ZF, SF, and SU-MIMO), the MMSE with ZF provided: (1) a higher total throughput (Mbps) (i.e., MMSE with ZF, 1956.0 Mbps; regularized ZF, 1378.0; ZF, 521.5; SU-MIMO, 479.0), (2) a higher 10th percentile throughput (Mbps) (i.e., MMSE with ZF, 11.9 Mbps; regularized ZF, 2.9 Mbps; ZF, 6.7; SU-MIMO, 10.0 Mbps), and (3) a higher per bit efficiency (Megabits per Watts (Mb/W) (i.e., MMSE with ZF, 1.6 Mb/W; regularized ZF, 1.0 Mb/W; ZF, 0.8 Mb/W; SU-MIMO, 0.4 Mb/W). The MMSE with ZF was less computationally efficient compared to regularized ZF, ZF, and SU-MIMO) (i.e., MMSE with ZF, 0.0; regularized ZF, 55.0; ZF, 60.0; SU-MIMO, 100.0).

Example 6-B: 32 TX and 32 UEs with 14% Channel Estimation Error

For Case 2, the comparison was performed based on the following properties of the MU-MIMO network.
32 Tx (arranged in 8×4×2),
32 UEs,
5 groups,
average number of layers: 11.8,
average channel estimation error 14%.

Figure 25:
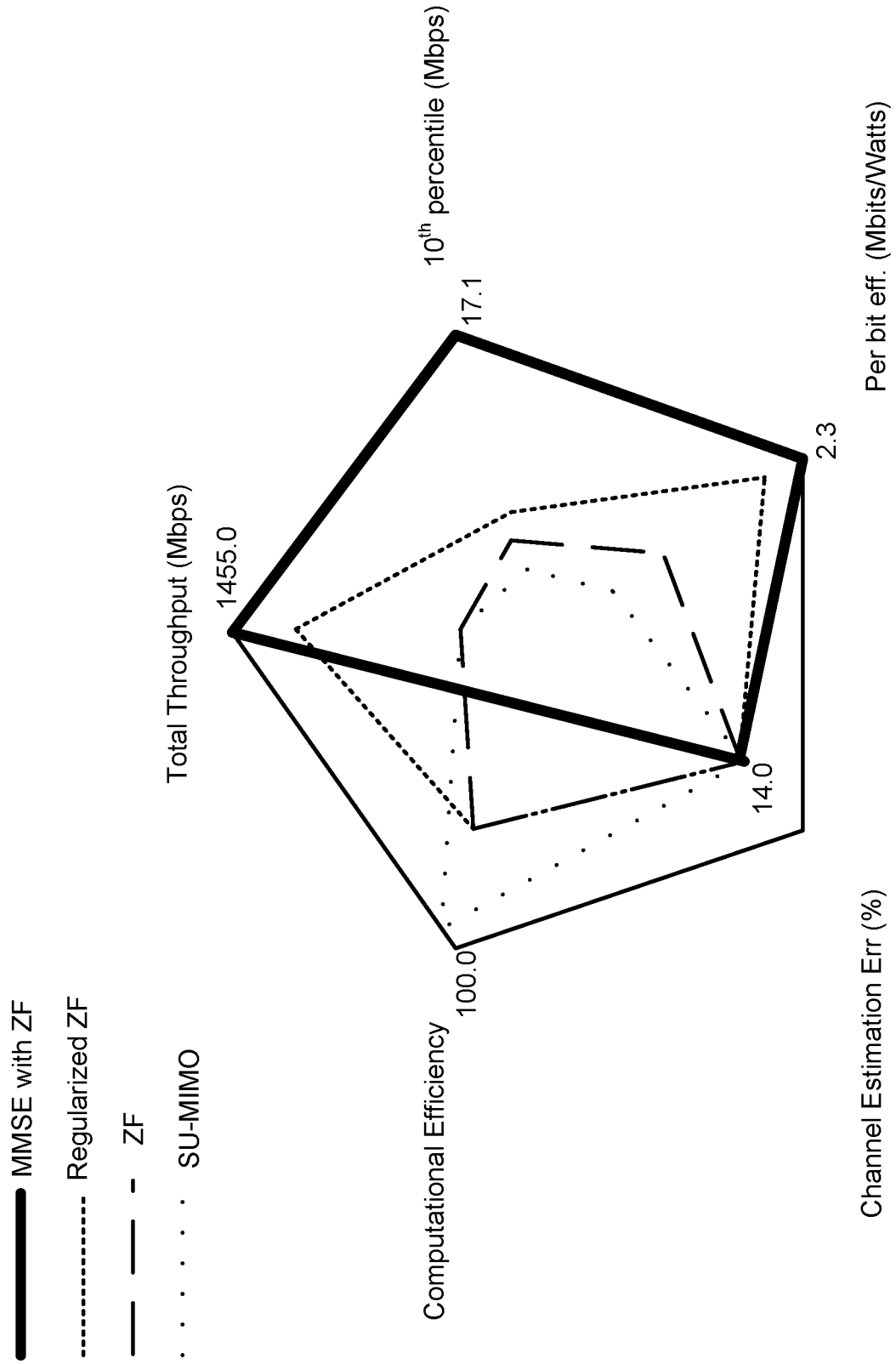
FIG. 25 illustrates an example of multi-user multiple input multiple-output (MU-MIMO) system capacity.

As shown in FIG. 25, for a channel estimation error of 14% (for MMSE with ZF, regularized ZF, SF, and SU-MIMO), the MMSE with ZF provided: (1) a higher total throughput (Mbps) (i.e., MMSE with ZF, 1455.0 Mbps; regularized ZF, 1157.0; ZF, 475.5; SU-MIMO, 425.0), (2) a higher 10th percentile throughput (Mbps) (i.e., MMSE with ZF, 17.1 Mbps; regularized ZF, 11.8 Mbps; ZF, 11.0; SU-MIMO, 10.5 Mbps), and (3) a higher per bit efficiency (Megabits per Watts (Mb/W) (i.e., MMSE with ZF, 2.3 Mb/W; regularized ZF, 2.0 Mb/W; ZF, 1.1 Mb/W; SU-MIMO, 0.6 Mb/W). The MMSE with ZF was less computationally efficient compared to regularized ZF, ZF, and SU-MIMO) (i.e., MMSE with ZF, 0.0; regularized ZF, 55.0; ZF, 60.0; SU-MIMO, 100.0).

In some embodiments, the different components, modules, engines, and services described herein may be implemented as objects or processes that execute on a computing system (e.g., as separate threads). While some of the systems and methods described herein are generally described as being implemented in software (stored on and/or executed by hardware), specific hardware implementations or a combination of software and specific hardware implementations are also possible and contemplated.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A base station (BS) configured for beamforming estimation in a massive multiple input multiple output (mMIMO) radio access network (RAN) (mMIMO-RAN), comprising:
a processing device configured to:
obtain, at the BS, a channel estimate for a user equipment (UE);
compute, at the BS, a first power level adjustment for a downlink (DL) signal for transmission to the UE, wherein the first power level adjustment is computed using the channel estimate for the UE;
compute, at the BS, a second power level adjustment for the DL signal for transmission to the UE, wherein the second power level adjustment is computed by adjusting the first power level adjustment based on an antenna power constraint; and
precode, at the BS, using the second power level adjustment, the DL signal for transmission to the UE; and
a transceiver configured to transmit the DL signal to the UE.

2. The BS of claim 1, wherein the second power level is computed using minimum mean square error (MMSE).

3. The BS of claim 2, wherein the MMSE is one or more of: a coverage-based MMSE, a throughput-based MMSE, or a robust MMSE.

4. The BS of claim 1, wherein the first power level adjustment is computed using zero forcing (ZF) to minimize noise and interference and maximize signal as measured by a ratio including one or more of: a signal to interference plus noise ratio (SINK) or an interference plus noise to signal (INSR) ratio.

5. The BS of claim 1, wherein the channel estimate is obtained using a reference signal including a sounding reference signal (SRS).

6. The BS of claim 1, wherein the channel estimate is transmitted from the UE to the BS using a sounding reference signal (SRS).

7. The BS of claim 1, wherein the BS is an open radio access network (O-RAN) radio unit (O-RU) 7.2 split (O-RAN 7-2).

8. The BS of claim 1, wherein the DL signal is precoded using a precoder matrix that is generated based on one or more of a number of downlink layers for a component carrier, a number of transmit antenna elements, a number of receive antenna elements, a polarization, or a number of antenna ports.

9. The BS of claim 8, wherein:
the number of downlink layers is at least 8,
the number of transmit antenna elements is at least 32, and
the number of receive antenna elements is at least 32.

10. A user equipment (UE) configured for beamforming estimation in a massive multiple input multiple output (mMIMO) radio access network (RAN) (mMIMO-RAN), comprising:
a transceiver configured to receive a downlink (DL) signal having a precoded message from a base station (BS); and
a processing device configured to:
send, at the UE, a channel estimate for the UE; and
generate, at the UE, a decoder by:
initializing the decoder using the channel estimate, and
adjusting the decoder to decode the precoded message,
wherein the precoded message was precoded based on an antenna power constraint;
decode, at the UE, the precoded message using the decoder.

11. The UE of claim 10, wherein the decoder is initialized using zero forcing to minimize noise and interference as measured by a ratio including one or more of: a signal to interference plus noise ratio (SINK) or an interference plus noise to signal (INSR) ratio.

12. The UE of claim 10, wherein the precoded message was generated based on the antenna power constraint using minimum mean square error (MMSE).

13. The UE of claim 10, wherein the channel estimate is transmitted from the UE to the BS using a sounding reference signal (SRS).

14. The UE of claim 10, wherein the UE is operable with a BS that is an open radio access network (O-RAN) radio unit (O-RU) 7.2 split (O-RAN 7-2).

15. A non-transitory computer-readable storage medium including computer executable instructions that, when executed by one or more processors, cause a base station (BS) in a massive multiple input multiple output (mMIMO) radio access network (RAN) (mMIMO-RAN) to:
initialize a precoder using zero-forcing based on a channel estimate;
adjust the precoder based on jointly maximizing the signal with respect to noise and minimizing an interference with respect to the noise;
adjust the precoder based on a power constraint using minimum mean square error (MMSE); and
generate the precoder for precoding a downlink signal for transmission from the BS to a user equipment (UE).

16. The computer-readable storage medium of claim 15, wherein the instructions, when executed by the one or more processors, further cause the BS to:
generate the precoder based on a precoding gradient and a precoding partial Hessian.

17. The computer-readable storage medium of claim 15, wherein the instructions, when executed by the one or more processors, further cause the BS to:
adjust the precoder based on a power constraint using gradient descent.

18. The computer-readable storage medium of claim 15, wherein the instructions, when executed by the one or more processors, further cause the BS to:
initialize a decoder using a channel estimate and the precoder;
generate the decoder based on a decoding gradient and a decoding partial Hessian; and
project the decoder into a set of decoders.

19. The computer-readable storage medium of claim 15, wherein the instructions, when executed by the one or more processors, further cause the BS to:
jointly maximize the signal with respect to noise using a signal-to-noise ratio (SNR) constraint and minimize the interference with respect to noise using a signal-to-interference-plus-noise ratio (SINR) constraint.

20. The computer-readable storage medium of claim 15, wherein the instructions, when executed by the one or more processors, further cause the BS to:
generate the precoder based on one or more of a number of downlink layers for a component carrier, a total number of UEs, a total number of transmit antenna elements, a total number of receive antenna elements, a total number of resource blocks (RBs) available for beamforming, an error parameter, or a regularization parameter.

\* \* \* \* \*